US012188842B2

(12) United States Patent
Richardson et al.

(10) Patent No.: US 12,188,842 B2
(45) Date of Patent: Jan. 7, 2025

(54) OUTLET SAMPLING SYSTEM FOR AFTERTREATMENT SYSTEM

(71) Applicant: Cummins Emission Solutions Inc., Columbus, IN (US)

(72) Inventors: Dylan J. Richardson, Fitchburg, WI (US); Monika Agrawal, Pune (IN); Jim L. Alonzo, Verona, WI (US); Amol Yuvraj Patil, Pune (IN)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/685,792

(22) PCT Filed: Aug. 22, 2022

(86) PCT No.: PCT/US2022/041073
§ 371 (c)(1),
(2) Date: Feb. 22, 2024

(87) PCT Pub. No.: WO2023/028002
PCT Pub. Date: Mar. 2, 2023

(65) Prior Publication Data
US 2024/0328899 A1    Oct. 3, 2024

(30) Foreign Application Priority Data
Aug. 23, 2021  (IN) .............................. 202141037998

(51) Int. Cl.
*G01M 15/10* (2006.01)
*B01D 53/94* (2006.01)
*G01N 1/22* (2006.01)

(52) U.S. Cl.
CPC ........... *G01M 15/10* (2013.01); *B01D 53/944* (2013.01); *B01D 53/9477* (2013.01);
(Continued)

(58) Field of Classification Search
CPC . G01M 15/10; B01D 53/944; B01D 53/9477; B01D 53/9495; B01D 2257/502;
(Continued)

(56) References Cited

U.S. PATENT DOCUMENTS

| 1,104,963 A | 7/1914 | Coanda |
| 3,699,407 A | 10/1972 | Gurtler et al. |

(Continued)

FOREIGN PATENT DOCUMENTS

| CN | 1864835 A | 11/2006 |
| CN | 101501308 A | 8/2009 |

(Continued)

OTHER PUBLICATIONS

Coanda effect, https://en.wikipedia.org/w/index.php?title=Coand%C4%83_effect&oldid=1000333406 (last visited Mar. 12, 2021).

(Continued)

*Primary Examiner* — Freddie Kirkland, III
(74) *Attorney, Agent, or Firm* — Foley & Lardner LLP

(57) ABSTRACT

An exhaust gas aftertreatment system includes an outlet housing body, an outlet housing fitting, an outlet sampling system, and an outlet sensor. The outlet sampling system includes a sampling bowl and a sampling ring. The sampling bowl is coupled to the outlet housing body and extends away from the outlet housing body so as to define a sampling bowl cavity between the sampling bowl and the outlet housing body. The sampling ring is coupled to the sampling bowl and separated from the outlet housing body by the sampling bowl. The sampling ring is coupled to the outlet housing fitting and defines a sampling ring cavity. The sampling ring includes a plurality of sampling ring inlet apertures and a connector. The sampling ring inlet apertures are each con- (Continued)

figured to receive exhaust gas from within the outlet housing body and provide the exhaust gas to the sampling ring cavity.

20 Claims, 21 Drawing Sheets

(52) U.S. Cl.
CPC ........... B01D 53/9495 (2013.01); G01N 1/22 (2013.01); B01D 2257/502 (2013.01); B01D 2257/702 (2013.01); B01D 2258/01 (2013.01)

(58) Field of Classification Search
CPC . B01D 2257/702; B01D 2258/01; G01N 1/22
See application file for complete search history.

(56) References Cited

U.S. PATENT DOCUMENTS

| | | | |
|---|---|---|---|
| 4,424,777 A | 1/1984 | Klomp | |
| 6,444,177 B1 | 9/2002 | Muller et al. | |
| 7,127,884 B2 | 10/2006 | Worner et al. | |
| 7,581,387 B2 | 9/2009 | Bui et al. | |
| 7,793,490 B2 | 9/2010 | Amon et al. | |
| 7,836,688 B2 | 11/2010 | Woerner et al. | |
| 7,866,143 B2 | 1/2011 | Buhmann et al. | |
| 8,033,101 B2 | 10/2011 | Amon et al. | |
| 8,230,678 B2 | 7/2012 | Aneja et al. | |
| 8,375,708 B2 | 2/2013 | Forster et al. | |
| 8,460,610 B2 | 6/2013 | Silver et al. | |
| 8,607,555 B2 | 12/2013 | Kaiser et al. | |
| 8,615,984 B2 | 12/2013 | Kornherr et al. | |
| 8,695,330 B2 | 4/2014 | Davidson et al. | |
| 8,776,509 B2 | 7/2014 | Wikaryasz et al. | |
| 8,789,363 B2 | 7/2014 | Iverson et al. | |
| 9,021,794 B2 | 5/2015 | Goss et al. | |
| 9,133,744 B2 | 9/2015 | Birkby et al. | |
| 9,248,404 B2 | 2/2016 | Brunel et al. | |
| 9,266,075 B2 | 2/2016 | Chapman et al. | |
| 9,267,417 B2 | 2/2016 | Baldwin et al. | |
| D757,919 S | 5/2016 | Ltd | |
| 9,328,640 B2 | 5/2016 | Iverson et al. | |
| 9,346,017 B2 | 5/2016 | Greber | |
| 9,352,276 B2 | 5/2016 | Sampath | |
| 9,453,444 B2 | 9/2016 | Fischer et al. | |
| 9,464,546 B2 | 10/2016 | Perrot et al. | |
| 9,504,960 B2 | 11/2016 | Park | |
| 9,581,067 B2 | 2/2017 | Guilbaud et al. | |
| D781,071 S | 3/2017 | Callif et al. | |
| 9,605,573 B2 | 3/2017 | Solbrig et al. | |
| 9,644,516 B1 | 5/2017 | Chiruta et al. | |
| 9,664,081 B2 | 5/2017 | Rusch et al. | |
| 9,714,598 B2 | 7/2017 | Alano et al. | |
| D794,100 S | 8/2017 | Mcdonald et al. | |
| 9,726,064 B2 | 8/2017 | Alano | |
| 9,737,908 B2 | 8/2017 | Hornback et al. | |
| 9,776,135 B2 | 10/2017 | Boeshans et al. | |
| D809,577 S | 2/2018 | Mcdonald et al. | |
| D816,010 S | 4/2018 | Rike | |
| 9,995,193 B2 | 6/2018 | Alano et al. | |
| 10,024,217 B1 | 7/2018 | Johnson et al. | |
| 10,030,564 B2 | 7/2018 | Cossard et al. | |
| 10,086,332 B2* | 10/2018 | Zhang | B01F 25/3141 |
| 10,100,706 B2* | 10/2018 | Zhang | F01N 13/082 |
| 10,174,658 B2 | 1/2019 | Dimpelfeld et al. | |
| 10,190,465 B2 | 1/2019 | Alano et al. | |
| D840,908 S | 2/2019 | Rike | |
| 10,215,075 B2 | 2/2019 | Chapman et al. | |
| 10,247,081 B2 | 4/2019 | Niaz | |
| 10,273,853 B2 | 4/2019 | Golin | |
| 10,273,854 B1 | 4/2019 | Abbassi et al. | |
| D849,662 S | 5/2019 | Rike | |
| 10,287,948 B1 | 5/2019 | Moulieres et al. | |
| 10,287,954 B2 | 5/2019 | Chapman et al. | |
| 10,294,843 B2 | 5/2019 | Alano et al. | |
| 10,316,721 B1 | 6/2019 | Moulieres et al. | |
| D855,090 S | 7/2019 | Mcdonald et al. | |
| 10,337,379 B2 | 7/2019 | Dimpelfeld et al. | |
| 10,337,380 B2 | 7/2019 | Willats et al. | |
| 10,422,268 B2 | 9/2019 | Niaz | |
| 10,533,478 B2 | 1/2020 | Alano | |
| 10,577,995 B2 | 3/2020 | Ker et al. | |
| 10,612,443 B2 | 4/2020 | Li et al. | |
| 10,632,430 B1 | 4/2020 | Liu et al. | |
| 10,731,536 B2 | 8/2020 | Chenoweth et al. | |
| 10,787,946 B2 | 9/2020 | Rohde et al. | |
| 10,808,587 B2 | 10/2020 | Ottaviani et al. | |
| 10,823,032 B2 | 11/2020 | Willats et al. | |
| 10,907,520 B1 | 2/2021 | Ker et al. | |
| 10,907,522 B2 | 2/2021 | Poinsot et al. | |
| 10,914,218 B1 | 2/2021 | Chapman et al. | |
| 10,920,635 B2 | 2/2021 | Kozakiewicz | |
| 10,920,642 B2 | 2/2021 | Wang et al. | |
| 10,933,387 B2 | 3/2021 | Cvelbar | |
| 10,967,329 B2 | 4/2021 | Alano et al. | |
| 11,085,346 B2 | 8/2021 | Tucker et al. | |
| 11,105,241 B2 | 8/2021 | Tucker et al. | |
| 11,143,084 B2 | 10/2021 | Wahlstrom | |
| 11,193,412 B2 | 12/2021 | Cvelbar et al. | |
| 11,230,958 B2 | 1/2022 | Tucker et al. | |
| 11,242,788 B2 | 2/2022 | Kinnaird | |
| 11,242,790 B2 | 2/2022 | Chapman et al. | |
| 11,268,424 B2 | 3/2022 | Kimura et al. | |
| 11,300,028 B2 | 4/2022 | Meunier | |
| 11,313,266 B2 | 4/2022 | Tucker et al. | |
| 11,428,140 B1 | 8/2022 | Kinnaird et al. | |
| 11,459,927 B2 | 10/2022 | Rajashekharaiah et al. | |
| 11,459,929 B2 | 10/2022 | Dimpelfeld et al. | |
| 11,506,101 B2 | 11/2022 | Levato et al. | |
| 11,519,316 B2* | 12/2022 | Buening | F01N 13/1888 |
| 11,591,943 B2 | 2/2023 | Hornback | |
| 11,725,561 B2* | 8/2023 | Ringstad | F01N 13/008 60/274 |
| 11,746,684 B2 | 9/2023 | Wahlstrom | |
| 11,761,365 B2 | 9/2023 | Liu et al. | |
| 2002/0023435 A1 | 2/2002 | Woerner et al. | |
| 2004/0112883 A1 | 6/2004 | Bowden et al. | |
| 2004/0237511 A1 | 12/2004 | Ripper et al. | |
| 2005/0172615 A1 | 8/2005 | Mahr | |
| 2005/0262843 A1 | 12/2005 | Monty | |
| 2006/0150614 A1 | 7/2006 | Cummings | |
| 2006/0153748 A1 | 7/2006 | Huthwohl et al. | |
| 2006/0191254 A1 | 8/2006 | Bui et al. | |
| 2006/0260104 A1 | 11/2006 | Himi | |
| 2006/0266022 A1 | 11/2006 | Woerner et al. | |
| 2006/0283181 A1 | 12/2006 | Crawley et al. | |
| 2007/0144126 A1 | 6/2007 | Ohya et al. | |
| 2007/0163241 A1 | 7/2007 | Meingast et al. | |
| 2007/0245718 A1 | 10/2007 | Cheng et al. | |
| 2007/0283683 A1 | 12/2007 | Bellinger | |
| 2007/0289294 A1 | 12/2007 | Werni et al. | |
| 2008/0087013 A1 | 4/2008 | Crawley et al. | |
| 2008/0121179 A1 | 5/2008 | Park et al. | |
| 2008/0127635 A1 | 6/2008 | Hirata et al. | |
| 2008/0314033 A1 | 12/2008 | Aneja et al. | |
| 2009/0000283 A1 | 1/2009 | Endicott et al. | |
| 2009/0019843 A1 | 1/2009 | Levin et al. | |
| 2009/0031717 A1 | 2/2009 | Blaisdell | |
| 2009/0049829 A1 | 2/2009 | Kaiser et al. | |
| 2009/0084094 A1 | 4/2009 | Goss et al. | |
| 2009/0145119 A1 | 6/2009 | Farrell et al. | |
| 2009/0158717 A1 | 6/2009 | Kimura et al. | |
| 2009/0158721 A1 | 6/2009 | Wieland et al. | |
| 2009/0158722 A1 | 6/2009 | Kojima et al. | |
| 2009/0180937 A1 | 7/2009 | Nohl et al. | |
| 2009/0229254 A1 | 9/2009 | Gibson | |
| 2009/0272106 A1 | 11/2009 | Werni et al. | |
| 2010/0083641 A1 | 4/2010 | Makartchouk et al. | |
| 2010/0146942 A1 | 6/2010 | Mayr et al. | |
| 2010/0146948 A1 | 6/2010 | Dacosta et al. | |
| 2010/0187383 A1 | 7/2010 | Olsen et al. | |
| 2010/0251719 A1 | 10/2010 | Mancini et al. | |
| 2010/0319329 A1 | 12/2010 | Khadiya | |

(56) References Cited

U.S. PATENT DOCUMENTS

| | | |
|---|---|---|
| 2011/0005232 A1 | 1/2011 | Williams et al. |
| 2011/0079003 A1 | 4/2011 | Sun et al. |
| 2011/0094206 A1 | 4/2011 | Liu et al. |
| 2011/0099978 A1 | 5/2011 | Davidson et al. |
| 2011/0146237 A1 | 6/2011 | Adelmann et al. |
| 2011/0146253 A1 | 6/2011 | Isada et al. |
| 2011/0194987 A1 | 8/2011 | Hodgson et al. |
| 2012/0003955 A1 | 1/2012 | Gabriel |
| 2012/0124983 A1 | 5/2012 | Hong |
| 2012/0204541 A1 | 8/2012 | Li et al. |
| 2012/0204542 A1 | 8/2012 | Norris et al. |
| 2012/0204544 A1 | 8/2012 | Uhrich et al. |
| 2012/0216513 A1 | 8/2012 | Greber et al. |
| 2013/0067891 A1 | 3/2013 | Hittle et al. |
| 2013/0097819 A1 | 4/2013 | Kojima |
| 2013/0213013 A1 | 8/2013 | Mitchell et al. |
| 2013/0333363 A1 | 12/2013 | Joshi et al. |
| 2014/0033686 A1 | 2/2014 | Fischer et al. |
| 2014/0193318 A1 | 7/2014 | Davidson et al. |
| 2014/0230418 A1 | 8/2014 | Perrot et al. |
| 2014/0260209 A1 | 9/2014 | Goss et al. |
| 2014/0325967 A1 | 11/2014 | Kimura |
| 2014/0373721 A1 | 12/2014 | Sandou et al. |
| 2015/0000389 A1 | 1/2015 | Runde et al. |
| 2015/0016214 A1 | 1/2015 | Mueller |
| 2015/0089923 A1 | 4/2015 | Henderson et al. |
| 2015/0110681 A1 | 4/2015 | Ferront et al. |
| 2015/0121855 A1 | 5/2015 | Munnannur et al. |
| 2015/0218996 A1 | 8/2015 | Brandl et al. |
| 2015/0224870 A1 | 8/2015 | Shin et al. |
| 2015/0233276 A1 | 8/2015 | Cassity et al. |
| 2015/0360176 A1 | 12/2015 | Bui et al. |
| 2016/0061090 A1 | 3/2016 | Anand et al. |
| 2016/0069239 A1 | 3/2016 | Freeman et al. |
| 2016/0083060 A1 | 3/2016 | Kassianoff |
| 2016/0090887 A1 | 3/2016 | Mitchell et al. |
| 2016/0115847 A1 | 4/2016 | Chapman et al. |
| 2016/0138454 A1 | 5/2016 | Alano et al. |
| 2016/0158714 A1 | 6/2016 | Li et al. |
| 2016/0175784 A1 | 6/2016 | Harmon et al. |
| 2016/0194991 A1 | 7/2016 | Clayton et al. |
| 2016/0243510 A1 | 8/2016 | Denton et al. |
| 2016/0251990 A1 | 9/2016 | Dimpelfeld et al. |
| 2016/0326931 A1 | 11/2016 | Freeman et al. |
| 2016/0332126 A1 | 11/2016 | Nande et al. |
| 2016/0361694 A1 | 12/2016 | Brandl et al. |
| 2016/0376969 A1 | 12/2016 | Zhang et al. |
| 2017/0067387 A1 | 3/2017 | Khaled |
| 2017/0089246 A1 | 3/2017 | Greber et al. |
| 2017/0107882 A1 | 4/2017 | Chiruta et al. |
| 2017/0152778 A1 | 6/2017 | Li et al. |
| 2017/0327273 A1 | 11/2017 | Lee et al. |
| 2017/0361273 A1 | 12/2017 | Zoran et al. |
| 2017/0370262 A1 | 12/2017 | Zoran et al. |
| 2018/0078912 A1 | 3/2018 | Yadav et al. |
| 2018/0087428 A1 | 3/2018 | Barr |
| 2018/0142604 A1 | 5/2018 | Niaz |
| 2018/0266300 A1 | 9/2018 | Liu et al. |
| 2018/0306083 A1 | 10/2018 | Sampath et al. |
| 2018/0313247 A1 | 11/2018 | Bauknecht et al. |
| 2019/0063294 A1 | 2/2019 | Johnson et al. |
| 2019/0107025 A1 | 4/2019 | Brinkmeyer |
| 2019/0323397 A1 | 10/2019 | Pill et al. |
| 2020/0102873 A1 | 4/2020 | Ramolivo et al. |
| 2020/0123955 A1 | 4/2020 | Liu et al. |
| 2020/0325811 A1 | 10/2020 | Levin et al. |
| 2020/0332696 A1 | 10/2020 | Chapman et al. |
| 2021/0039056 A1 | 2/2021 | De Rudder et al. |
| 2021/0062698 A1 | 3/2021 | Ottinger et al. |
| 2021/0095587 A1 | 4/2021 | Cvelbar et al. |
| 2021/0301704 A1 | 9/2021 | Hornback |
| 2021/0301710 A1 | 9/2021 | Cvelbar et al. |
| 2021/0363907 A1 | 11/2021 | Poinsot et al. |
| 2021/0404367 A1 | 12/2021 | Alano et al. |
| 2022/0065148 A1 | 3/2022 | Sudries et al. |
| 2022/0090532 A1 | 3/2022 | Degner et al. |
| 2022/0099121 A1 | 3/2022 | Kumar |
| 2022/0162975 A1 | 5/2022 | Cvelbar et al. |
| 2022/0162976 A1 | 5/2022 | Alano et al. |
| 2022/0178296 A1 | 6/2022 | Hogan |
| 2022/0184567 A1 | 6/2022 | Geant |
| 2022/0205378 A1* | 6/2022 | Ringstad ................. F01N 3/208 |
| 2022/0316382 A1 | 10/2022 | De Rudder |
| 2022/0349330 A1 | 11/2022 | Chapman et al. |
| 2022/0379272 A1 | 12/2022 | Alano |
| 2023/0003159 A1 | 1/2023 | Mittapalli et al. |
| 2023/0141549 A1 | 5/2023 | Kalyanshetti |

FOREIGN PATENT DOCUMENTS

| | | |
|---|---|---|
| CN | 101815851 A | 8/2010 |
| CN | 102242662 A | 11/2011 |
| CN | 103429864 A | 12/2013 |
| CN | 105143628 | 12/2015 |
| CN | 105612325 A | 5/2016 |
| CN | 105715340 A | 6/2016 |
| CN | 205559030 U | 9/2016 |
| CN | 106377919 A | 2/2017 |
| CN | 206144632 U | 5/2017 |
| CN | 206144633 U | 5/2017 |
| CN | 106968765 | 7/2017 |
| CN | 107435576 A | 12/2017 |
| CN | 108194176 A | 6/2018 |
| CN | 108252771 A | 7/2018 |
| CN | 108708781 | 10/2018 |
| CN | 109414661 A | 3/2019 |
| CN | 109477413 A | 3/2019 |
| CN | 208982145 U | 6/2019 |
| CN | 106014560 B | 7/2019 |
| CN | 106321199 B | 7/2019 |
| CN | 209179849 U | 7/2019 |
| CN | 209586479 U | 11/2019 |
| CN | 209855888 U | 12/2019 |
| CN | 110761876 A | 2/2020 |
| CN | 210195855 U | 3/2020 |
| CN | 210686097 U | 6/2020 |
| CN | 210858906 U | 6/2020 |
| CN | 211082028 U | 7/2020 |
| CN | 211116205 U | 7/2020 |
| CN | 211573625 U | 9/2020 |
| CN | 111810276 | 10/2020 |
| CN | 212130586 U | 12/2020 |
| CN | 212130587 U | 12/2020 |
| CN | 212296579 U | 1/2021 |
| CN | 112483224 | 3/2021 |
| CN | 212744129 U | 3/2021 |
| CN | 214304014 U | 9/2021 |
| CN | 214836650 U | 11/2021 |
| CN | 214887318 U | 11/2021 |
| CN | 215109110 U | 12/2021 |
| CN | 215719044 U | 2/2022 |
| CN | 215719045 U | 2/2022 |
| CN | 216157745 U | 4/2022 |
| CN | 216617626 U | 5/2022 |
| CN | 217872989 U | 11/2022 |
| DE | 10021166 A1 | 11/2001 |
| DE | 10312212 A1 | 11/2003 |
| DE | 10245297 B3 | 1/2004 |
| DE | 10 2004 043 931 A1 | 3/2006 |
| DE | 10 2010 014 037 A1 | 11/2010 |
| DE | 11 2009 000 650 T5 | 1/2011 |
| DE | 11 2010 002 589 T5 | 11/2012 |
| DE | 10 2014 101 889 A1 | 8/2015 |
| DE | 10 2014 102 798 A1 | 9/2015 |
| DE | 10 2016 208 814 A1 | 12/2016 |
| DE | 10 2016 222 743 A1 | 5/2017 |
| DE | 10 2016 115 030 A1 | 2/2018 |
| DE | 10 2018 127 387 A1 | 5/2019 |
| DE | 10 2007 051 510 B4 | 2/2021 |
| DE | 10 2020 121 659 A1 | 3/2021 |
| EP | 0 716 918 A2 | 6/1996 |
| EP | 1 716 917 A1 | 11/2006 |
| EP | 2 151 560 A1 | 2/2010 |
| EP | 2 769 762 A1 | 8/2014 |

(56) References Cited

FOREIGN PATENT DOCUMENTS

| | | |
|---|---|---|
| EP | 2 551 482 B1 | 1/2015 |
| EP | 2 546 488 B1 | 4/2015 |
| EP | 2 551 481 B1 | 8/2015 |
| EP | 3 085 913 A1 | 10/2016 |
| EP | 3 085 915 A1 | 10/2016 |
| EP | 3 085 916 A1 | 10/2016 |
| EP | 3 102 802 A1 | 12/2016 |
| EP | 2 570 178 B1 | 4/2017 |
| EP | 2 522 822 B1 | 6/2017 |
| EP | 2 796 684 B1 | 1/2018 |
| EP | 3 425 180 A1 | 1/2019 |
| EP | 3 699 407 A1 | 8/2020 |
| EP | 3 775 514 A1 | 2/2021 |
| FR | 2965011 A1 | 3/2012 |
| FR | 3010134 A1 | 3/2015 |
| FR | 2984953 B1 | 4/2015 |
| FR | 2977913 B1 | 6/2015 |
| FR | 3020835 A1 | 11/2015 |
| FR | 3020834 B1 | 6/2016 |
| FR | 3020835 B1 | 6/2016 |
| FR | 3098854 B1 | 7/2021 |
| FR | 3097775 B1 | 5/2022 |
| FR | 3102683 B1 | 6/2022 |
| FR | 3111664 B1 | 7/2022 |
| FR | 3110634 B1 | 9/2022 |
| GB | 2 385 545 A | 8/2003 |
| GB | 2 558 311 A | 7/2018 |
| IN | 201921025624 A | 1/2021 |
| JP | 2003-056274 A | 2/2003 |
| JP | 2009-156077 A | 7/2009 |
| JP | 2010-180863 A | 8/2010 |
| JP | 2013-133774 A | 7/2013 |
| WO | WO-2009/024815 A2 | 2/2009 |
| WO | WO-2009/024815 A3 | 2/2009 |
| WO | WO-2010/146285 A1 | 12/2010 |
| WO | WO-2011/110885 A1 | 9/2011 |
| WO | WO-2012/096675 A1 | 7/2012 |
| WO | WO-2012/110720 A1 | 8/2012 |
| WO | WO-2012/123660 A1 | 9/2012 |
| WO | WO-2015/119617 A1 | 8/2015 |
| WO | WO-2016/082850 A1 | 6/2016 |
| WO | WO-2016/111701 A1 | 7/2016 |
| WO | WO-2018/017164 A1 | 1/2018 |
| WO | WO-2018/075061 A1 | 4/2018 |
| WO | WO-2018/226626 A1 | 12/2018 |
| WO | WO-2019/029880 A1 | 2/2019 |
| WO | WO-2019/143373 A1 | 7/2019 |
| WO | WO-2020/009713 A1 | 1/2020 |
| WO | WO-2020/236158 A1 | 11/2020 |
| WO | WO-2021/050819 A1 | 3/2021 |
| WO | WO-2021/112826 A1 | 6/2021 |
| WO | WO-2021/113246 A1 | 6/2021 |
| WO | WO-2021/173357 A1 | 9/2021 |
| WO | WO-2021/225824 A1 | 11/2021 |

OTHER PUBLICATIONS

Combined Search and Examination Report in UK Patent Application No. GB2205057.9 dated May 5, 2022.
Examination Report in U.K. Patent Application No. GB1413056.1 dated Sep. 21, 2017.
Examination Report in U.K. Patent Application No. GB1805598.8 dated Apr. 24, 2018.
Examination Report in UK Patent Application No. GB2305850.6 issued May 26, 2023.
Examination Report in UK Patent Application No. GB1917608.0 issued Sep. 6, 2021.
Examination Report in UK Patent Application No. GB2305850.6 issued Oct. 11, 2023.
Extended European Search Report in EP Applicatio. No. 19955166.4 issued Jul. 10, 2023.
Final Office Action in U.S. Appl. No. 17/695,580 issued Feb. 6, 2023.
Final Office Action in U.S. Appl. No. 18/033,021 issued Nov. 16, 2023.
Final US Office Action in U.S. Appl. No. 13/837,446 issued Jan. 5, 2015.
First Examination Report in Indian Patent Application No. 201947050068, issued Jan. 13, 2021,.
First Examination Report in Indian Patent Application No. 202147057999, issued Mar. 14, 2022.
First Office Action issued for Chinese Patent Application No. 201880001223.6, issued Dec. 17, 2020, 9 pages.
Foreign Action in German Patent Application No. DE 11 2021 005 606.9 issued Dec. 14, 2023.
Foreign Action in UK Patent Application No. GB 2305850.6 issued Dec. 18, 2023.
Foreign Office Action in German Patent Application No. DE 102014002750.3, issued Jan. 24, 2022.
US Office Action in U.S. Appl. No. 14/372,810 issued May 25, 2016.
G. Comes, "Theoretical Modeling, Design and Simulation of an Innovative Diverting Valve Based in Coanda Effect", Fluids 2018, 3, 103, (2018).
International Search Report and Written Opinion in PCT/US2012/022582 dated Oct. 25, 2012.
International Search Report and Written Opinion in PCT Application No. PCT/US2020/062718 issued Feb. 19, 2021.
International Search Report and Written Opinion in PCT Application No. PCT/IB2019/054988 issued Jan. 29, 2020.
International Search Report and Written Opinion in PCT Application No. PCT/US2021/017551 issued Apr. 28, 2021.
International Search Report and Written Opinion in PCT Application No. PCT/US2021/056073, issued Jan. 26, 2022.
International Search Report and Written Opinion in PCT/US2022/014781 issued Apr. 25, 2022.
Written Opinion in PCT Application No. PCT/US2018/035959 issued Oct. 19, 2018.
International Search Report and Written Opinion in PCT Application No. PCT/US2021/029282 issued Jul. 27, 2021.
International Search Report in PCT Application No. PCT/US2018/035959, dated Oct. 19, 2018.
Non-Final Office Action in U.S. Appl. No. 15/657,941 issued Aug. 6, 2019.
Non-Final Office Action in U.S. Appl. No. 16/618,716 issued Feb. 23, 2021.
Non-Final Office Action in U.S. Appl. No. 17/400,567 issued May 23, 2022.
Non-Final Office Action in U.S. Appl. No. 17/695,580 issued Jul. 27, 2022.
Non-Final Office Action in U.S. Appl. No. 17/923,804 issued Mar. 16, 2023.
Non-Final Office Action in U.S. Appl. No. 18/033,021 issued Feb. 1, 2024.
Non-Final Office Action in U.S. Appl. No. 18/033,021 issued Jul. 18, 2023.
Non-Final Office Action in U.S. Appl. No. 29/835,755 issued Oct. 4, 2023.
Non-Final Office Action in U.S. Appl. No. 29/835,777 issued Oct. 4, 2023.
Office Action in Chinese Patent Application No. 2021800162220 issued Mar. 17, 2023.
Office Action in Chinese Patent Application No. 202180064965-5 issued Sep. 13, 2023.
Office Action in Chinese Patent Application No. 202210283795.6 issued Mar. 20, 2023.
Office Action in German Patent Application No. DE 11 2012 005 741.4 issued Dec. 7, 2022.
Preliminary Office Action in Brazilian Patent Application No. BR1120190253246 issued Apr. 26, 2022.
Search and Examination Report in UK Patent Application No. GB2116026.2 issued Dec. 20, 2021.
Search Report and Written Opinion in PCT Application No. PCT/US2019/064232 issued Feb. 12, 2020.
Search Report issued in UK Patent Application No. GB 2101393.3 issued Feb. 22, 2021.

(56) References Cited

OTHER PUBLICATIONS

Search Report Letter in UK Patent Application No. GB 2101393.3 issued Feb. 22, 2021.
US Office Action in U.S. Appl. No. 13/837,446 issued Aug. 29, 2014.
US Office Action in U.S. Appl. No. 14/372,810 issued Mar. 8, 2017.
Second Office Action in Chinese Patent Application No. 2021800649655 issued Feb. 9, 2024.
European Search Report in European Patent Application No. 20897056.6 issued Feb. 27, 2024.
International search report and written opinion for PCT Application No. PCT/US 2020/050318 issued Dec. 8, 2020.
International Search Report and Written Opinion issued for PCT/US2022/041073 issued Nov. 17, 2022.
Office Action in German Patent Application No. 11 2022 004 119.6 issued Aug. 7, 2024.

\* cited by examiner

OUTLET SAMPLING SYSTEM FOR AFTERTREATMENT SYSTEM

CROSS-REFERENCE

The present application is a national stage of PCT Application No. PCT/US2022/041073, filed on Aug. 22, 2022, which claims benefit of and priority to Indian Provisional Patent Application 202141037998, filed Aug. 23, 2021. The contents of these applications are incorporated herein by reference in their entireties.

TECHNICAL FIELD

The present disclosure relates generally to an outlet sampling system for an aftertreatment system for an internal combustion engine.

BACKGROUND

For an internal combustion engine system, it may be desirable to reduce emissions of certain components in exhaust gas produced by a combustion of fuel. One approach that can be implemented to reduce emissions is to treat the exhaust gas using an aftertreatment system. A sensor is often used at an outlet of the aftertreatment system to measure a property of the exhaust gas at the outlet. Based on the property, operation of the aftertreatment system may be controlled. However, the sensor typically protrudes into a flow of the exhaust gas. This protrusion may decrease accuracy of the measurement of the property and may enhance a failure rate of the sensor.

SUMMARY

In one embodiment, an exhaust gas aftertreatment system includes an outlet housing body, an outlet housing fitting, an outlet sampling system, and an outlet sensor. The outlet sampling system includes a sampling bowl and a sampling ring. The sampling bowl is coupled to the outlet housing body and extends away from the outlet housing body so as to define a sampling bowl cavity between the sampling bowl and the outlet housing body. The sampling ring is coupled to the sampling bowl and separated from the outlet housing body by the sampling bowl. The sampling ring is coupled to the outlet housing fitting and defines a sampling ring cavity. The sampling ring includes a plurality of sampling ring inlet apertures and a connector. The sampling ring inlet apertures are each configured to receive exhaust gas from within the outlet housing body and provide the exhaust gas to the sampling ring cavity. The connector extends along the sampling bowl and defines a connector cavity that is contiguous with the sampling ring cavity and the sampling bowl cavity. The outlet sensor is coupled to the outlet housing body so as to have a portion that is disposed within the sampling bowl cavity.

In another embodiment, an exhaust gas aftertreatment system includes an outlet housing body, an outlet housing fitting, an outlet sampling system, and an outlet sensor. The outlet housing fitting has a fitting aperture. The outlet sampling system includes a cover, a sampling ring, and a connector. The cover is coupled to the outlet housing body. The sampling ring defines a sampling ring cavity extending around the outlet housing fitting. The sampling ring includes a sampling ring floor flange, a sampling ring base flange, a sampling ring insert flange, a sampling ring inlet flange, and a plurality of sampling ring inlet apertures. The sampling ring floor flange is in confronting relation with the outlet housing body. The sampling ring base flange is contiguous with the sampling ring floor flange. The sampling ring insert flange is contiguous with the sampling ring base flange and in confronting relation with the outlet housing fitting. The sampling ring inlet flange is contiguous with the sampling ring base flange. The sampling ring inlet apertures are disposed on the sampling ring inlet flange. The sampling ring inlet apertures are configured to provide exhaust gas into the sampling ring cavity. The connector defines a connector cavity that is contiguous with the sampling ring cavity and is configured to receive the exhaust gas from the sampling ring cavity and to provide the exhaust gas to the fitting aperture. The outlet sensor is coupled to the outlet housing body so as to have a portion that is disposed within the connector cavity.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a housing assembly with a flow divider for an exhaust gas aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

In order to reduce emissions and optimize performance of an internal combustion engine, it may be desirable to use a sensor to determine one or more properties of exhaust gas. For example, it may be desirable to use a sensor to determine a concentration of undesirable constituents within the exhaust gas. However, the exhaust gas may expose the sensor to relatively high temperatures for prolonged periods of time. This can result in failure of the sensor, which can result in decreased performance or non-operation of a system using the sensor. Additionally, this can cause increased warranty claims associated with the sensor.

Implementations herein are related to an exhaust gas aftertreatment systems that includes an outlet sampling system which facilitates routing of the exhaust gas to an outlet sensor such that the outlet sensor is not exposed to exhaust gas within an outlet fitting, but is instead provided with a subset of the exhaust gas that otherwise flows into the outlet fitting. As a result, the outlet sensor is able to sample the exhaust gas while being protected from exposure to the relatively high temperature of the exhaust gas. This may enhance desirable operation of a system employing one of the outlet sampling systems described herein.

II. Overview of Exhaust Gas Aftertreatment Systems

Figure 1:
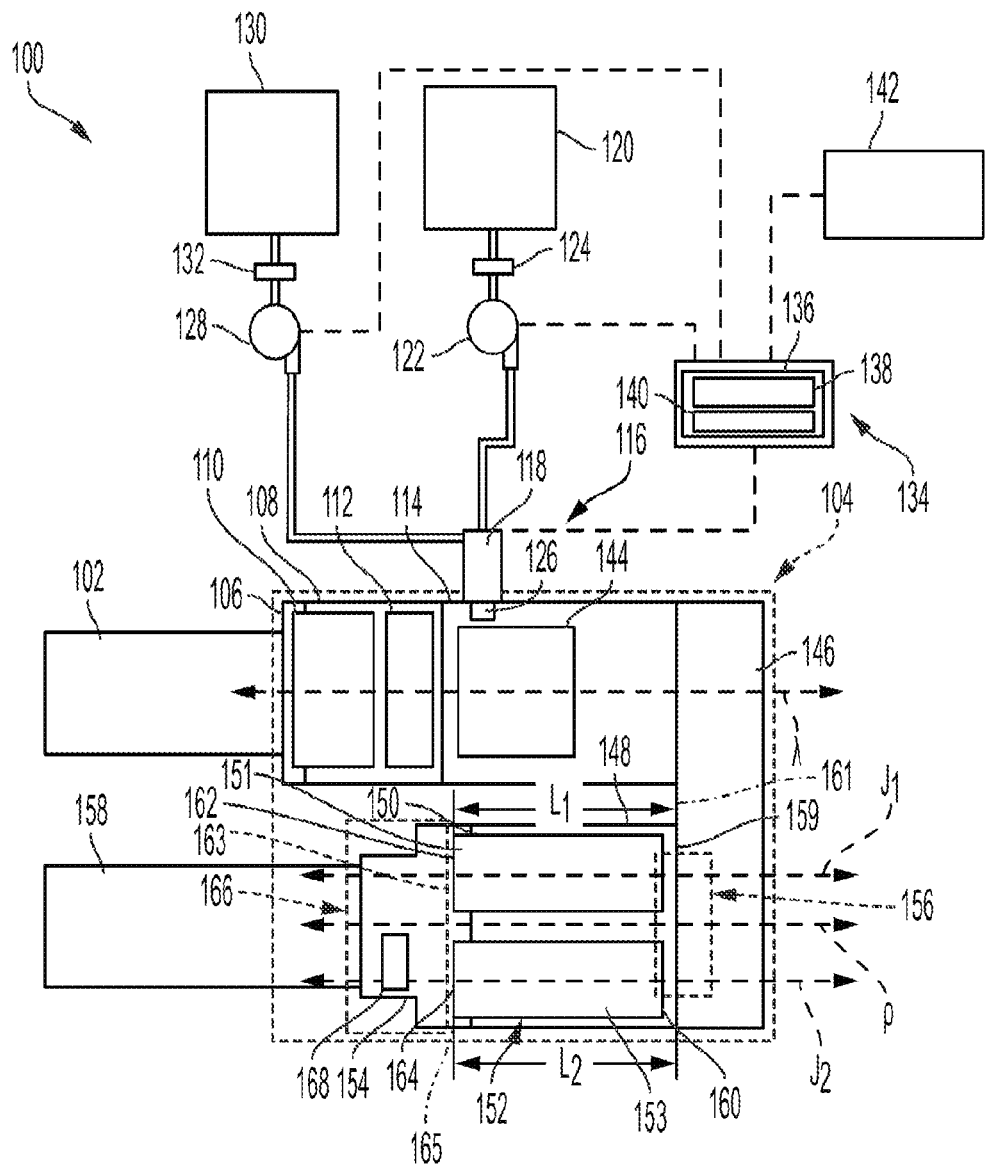
FIG. 1 is a schematic diagram of an example exhaust gas aftertreatment system including a housing assembly with a distributing housing.

FIG. 1 depicts an exhaust gas aftertreatment system 100 (e.g., treatment system, etc.) for treating exhaust gas produced by an internal combustion engine (e.g., diesel internal combustion engine, gasoline internal combustion engine, hybrid internal combustion engine, propane internal combustion engine, dual-fuel internal combustion engine, etc.). The exhaust gas aftertreatment system 100 includes an upstream exhaust gas conduit 102 (e.g., line, pipe, etc.). The upstream exhaust gas conduit 102 is fluidly coupled to an upstream component (e.g., header, exhaust manifold, etc.) and is configured to receive exhaust gas from the upstream component. In some embodiments, the upstream exhaust gas conduit 102 is coupled to (e.g., attached to, fixed to, welded to, fastened to, riveted to, etc.) the internal combustion engine (e.g., the upstream exhaust gas conduit 102 is coupled to an outlet of the internal combustion engine, etc.). In other embodiments, the upstream exhaust gas conduit 102 is integrally formed with the internal combustion engine. As utilized herein, two or more elements are "integrally formed" with each when the two or more elements are formed and joined together as part of a single manufacturing step to create a single-piece or unitary construction that cannot be disassembled without an at least partial destruction of the overall portion.

Figure 2:
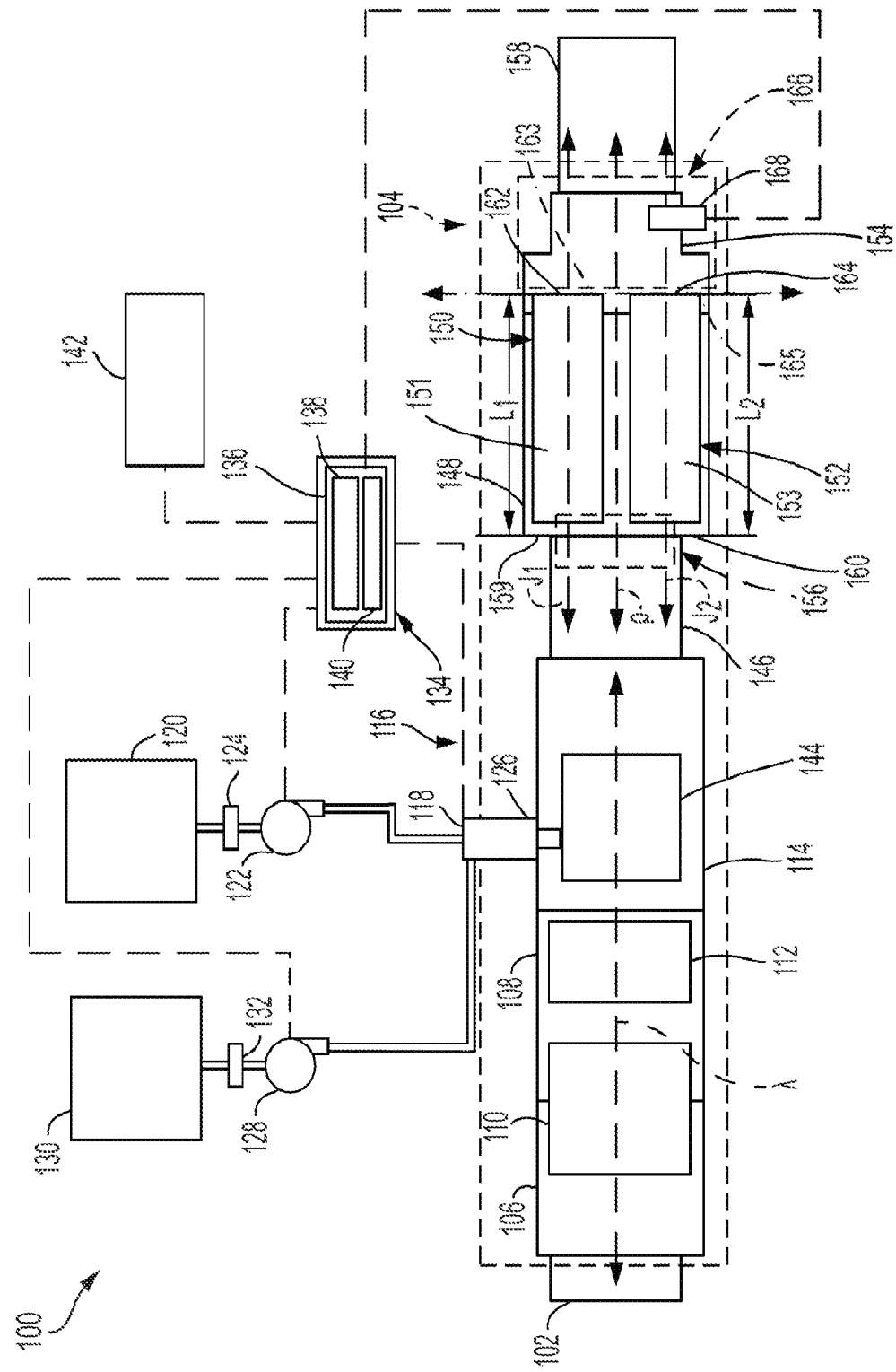
FIG. 2 is a schematic diagram of another example exhaust gas aftertreatment system including a housing assembly with a distributing housing.
Figure 3:
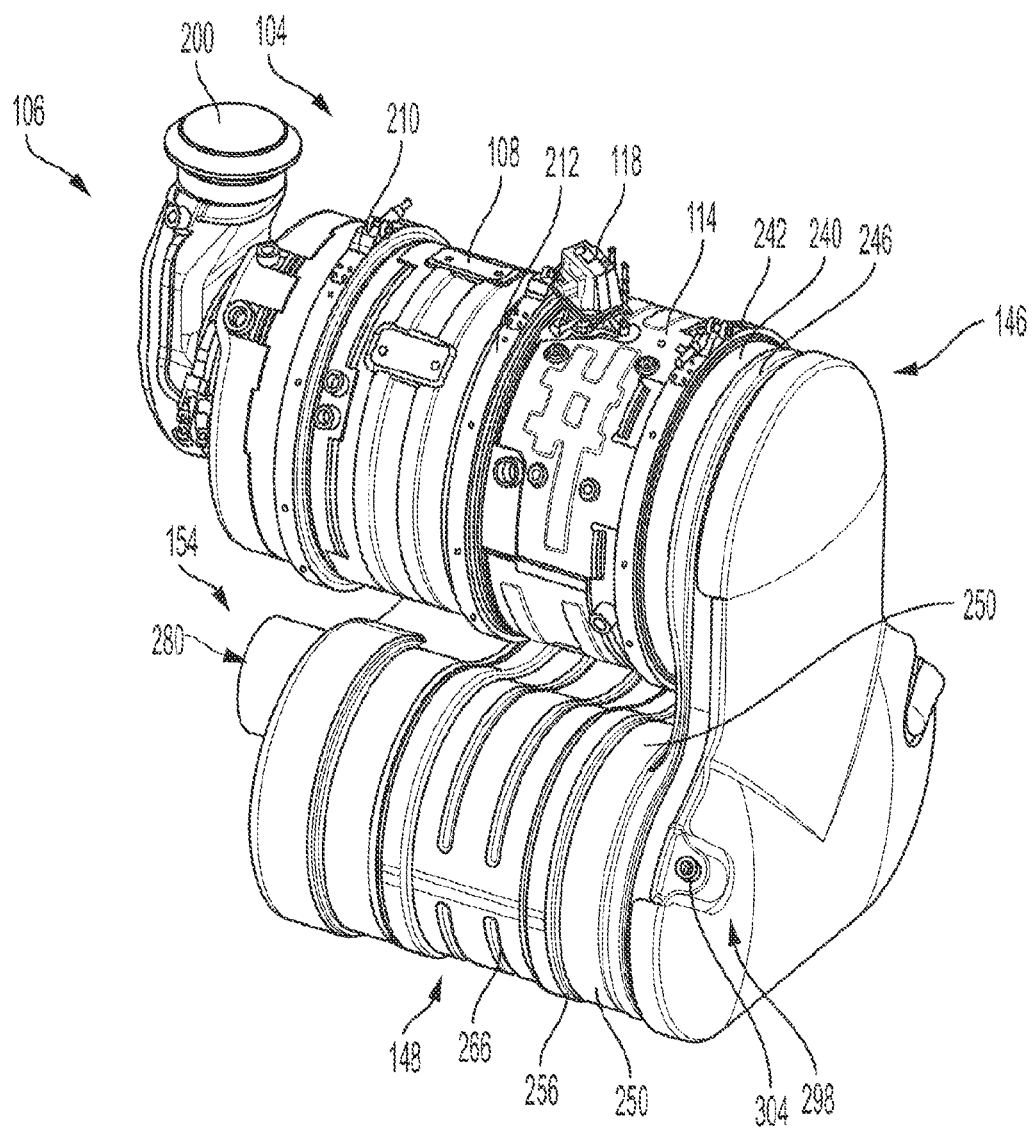
FIG. 3 is a perspective view of an example housing assembly for an exhaust gas aftertreatment system.

The exhaust gas aftertreatment system 100 also includes a housing assembly 104. In some embodiments, such as is shown in FIG. 1, the housing assembly 104 is configured to redirect the exhaust gas (e.g., from a first direction to a second direction, etc.) while facilitating treatment of the exhaust gas. In redirecting the exhaust gas, the housing assembly 104 may function as a switchback (e.g., redirecting the exhaust gas from a first direction to a second direction that is opposite to the first direction, redirecting the exhaust gas from a first direction to a second direction that is opposite to the first direction and parallel to the first direction, etc.). In other embodiments, such as is shown in FIG. 2, the housing assembly 104 is substantially straight (e.g., in an in-line configuration, etc.).

The housing assembly 104 includes an intake body 106 (e.g., chamber, etc.). The intake body 106 is fluidly coupled to the upstream exhaust gas conduit 102 and is configured to receive exhaust gas from the upstream exhaust gas conduit 102. The intake body 106 may be configured to redirect the exhaust gas from a first direction (e.g., extending along a center axis of the upstream exhaust gas conduit 102, etc.) to a second direction (e.g., that is orthogonal to the first direction, etc.).

The housing assembly 104 also includes an upstream housing 108 (e.g., chamber, body, etc.). The upstream housing 108 is fluidly coupled to the intake body 106 and is configured to receive exhaust gas from the intake body 106. In various embodiments, the upstream housing 108 is coupled to the intake body 106. For example, the upstream housing 108 may be fastened (e.g., using a band, using bolts, etc.), welded, riveted, or otherwise attached to the intake body 106. In other embodiments, the upstream housing 108 is integrally formed with (e.g., unitarily formed with, formed as a one-piece construction with, inseparable from, etc.) the intake body 106.

In various embodiments, the upstream housing 108 is centered on an upstream housing axis $\lambda$. In other words, a center point of a cross-section of the upstream housing 108 is disposed on the upstream housing axis $\lambda$ along a length of the upstream housing 108. The exhaust gas may be provided (e.g., outputted, etc.) through the upstream housing 108 in a direction that is parallel to, or coincident with, the upstream housing axis $\lambda$.

In some embodiments, the housing assembly 104 includes a heater (e.g., electrical heater, resistance heater, fluid heat exchanger, etc.) that is configured to heat the exhaust gas within the intake body 106 and/or the upstream housing 108. For example, the housing assembly 104 may include a heater that extends within the intake body 106 and is configured to heat the exhaust gas within the intake body 106. By heating the exhaust gas, an ability of catalyst members to desirably perform catalytic reactions may be increased. Additionally, heating the exhaust gas may facilitate regeneration (e.g., burn-off of particulates, etc.) of various components of the exhaust gas aftertreatment system 100.

The exhaust gas aftertreatment system 100 also includes an oxidation catalyst 110 (e.g., a diesel oxidation catalyst (DOC), etc.). At least a portion of the oxidation catalyst 110 is positioned within (e.g., contained within, housed within, located in, etc.) the upstream housing 108. In various embodiments, the oxidation catalyst 110 is positioned within the upstream housing 108 and the intake body 106. In other embodiments, the oxidation catalyst 110 is positioned within the upstream housing 108 and is not positioned within the intake body 106. In still other embodiments, the oxidation catalyst 110 is positioned within the intake body 106 and is not positioned within the upstream housing 108.

The exhaust gas is provided by the intake body 106 to the oxidation catalyst 110. The oxidation catalyst 110 may be configured to oxidize hydrocarbons and/or carbon monoxide in the exhaust gas. In this way, the oxidation catalyst 110 may remove hydrocarbons and/or carbon monoxide from the exhaust gas prior to the exhaust gas being provided to downstream components of the exhaust gas aftertreatment system 100. The oxidation catalyst 110 may be positioned within the intake body 106 and/or the upstream housing 108 (e.g., using a gasket, using a spacer, using a seal, etc.) such that flow of the exhaust gas between the oxidation catalyst and the intake body 106 and/or between the oxidation catalyst 110 and the upstream housing 108 is substantially prevented (e.g., less than 1% of the exhaust gas flow received by the intake body 106 flows between the oxidation catalyst 110 and the intake body 106, less than 1% of the exhaust gas flow received by the intake body 106 flows between the oxidation catalyst 110 and the upstream housing 108, etc.).

In some embodiments, the oxidation catalyst 110 is centered on the upstream housing axis $\lambda$. For example, where a diameter of the oxidation catalyst 110 is approximately (e.g., within 5% of, etc.) equal to a diameter of the upstream housing 108, a center point of a cross-section of the oxidation catalyst 110 may be disposed on the upstream housing axis $\lambda$ along a length of the oxidation catalyst 110. The exhaust gas may be provided through the oxidation catalyst 110 in a direction that is parallel to, or coincident with, the upstream housing axis $\lambda$. As utilized herein, the term "diameter" connotes a length of a chord passing through a center point of a shape (e.g., square, rectangle, hexagon, circle, pentagon, triangle, etc.).

The exhaust gas aftertreatment system 100 also includes an exhaust gas filtration device 112 (e.g., a diesel particulate filter (DPF), etc.). The exhaust gas filtration device 112 is positioned within the upstream housing 108 downstream of the oxidation catalyst 110. The exhaust gas is provided by the oxidation catalyst 110 into the upstream housing 108 (e.g., between the oxidation catalyst 110, the upstream housing 108, and the exhaust gas filtration device 112, etc.) and subsequently into the exhaust gas filtration device 112 (e.g., after hydrocarbons in the exhaust gas have been oxidized by the oxidation catalyst 110, after carbon monoxide in the exhaust gas has been oxidized by the oxidation catalyst 110, etc.). The exhaust gas filtration device 112 may remove particulates (e.g., soot, etc.) from the exhaust gas prior to the exhaust gas being provided to downstream components of the exhaust gas aftertreatment system 100. The exhaust gas filtration device 112 may be positioned within the upstream housing 108 (e.g., using a gasket, using a spacer, using a seal, etc.) such that flow of the exhaust gas between the exhaust gas filtration device 112 and the upstream housing 108 is substantially prevented (e.g., less than 1% of the exhaust gas flow received by the intake body 106 flows between the exhaust gas filtration device 112 and the upstream housing 108, etc.).

In some embodiments, the exhaust gas filtration device 112 is centered on the upstream housing axis $\lambda$. For example, where a diameter of the exhaust gas filtration device 112 is approximately equal to a diameter of the upstream housing 108, a center point of a cross-section of the exhaust gas filtration device 112 may be disposed on the upstream housing axis $\lambda$ along a length of the exhaust gas filtration device 112. The exhaust gas may be provided through the exhaust gas filtration device 112 in a direction that is parallel to, or coincident with, the upstream housing axis $\lambda$.

The housing assembly 104 also includes a decomposition housing 114 (e.g., decomposition reactor, decomposition chamber, reactor pipe, decomposition tube, reactor tube, etc.). The decomposition housing 114 is fluidly coupled to the upstream housing 108 and is configured to receive exhaust gas from the upstream housing 108. In various embodiments, the decomposition housing 114 is coupled to the upstream housing 108. For example, the decomposition housing 114 may be fastened (e.g., using a band, using bolts, etc.), welded, riveted, or otherwise attached to the upstream housing 108. In other embodiments, the decomposition housing 114 is integrally formed with the upstream housing 108.

In various embodiments, the decomposition housing 114 is centered on the upstream housing axis $\lambda$. For example, where a diameter of the decomposition housing 114 is approximately equal to a diameter of the upstream housing 108, a center point of a cross-section of the decomposition housing 114 may be disposed on the upstream housing axis $\lambda$ along a length of the decomposition housing 114. The exhaust gas may be provided through the decomposition housing 114 in a direction that is parallel to, or coincident with, the upstream housing axis $\lambda$. In other embodiments, the decomposition housing 114 is not centered on the upstream housing axis $\lambda$.

The decomposition housing 114 is located downstream of the exhaust gas filtration device 112 and receives the exhaust gas from the exhaust gas filtration device 112 (e.g., after particulates have been removed from the exhaust gas by the exhaust gas filtration device 112, etc.). As is explained in more detail herein, the decomposition housing 114 is configured to facilitate introduction of reductant (e.g., diesel exhaust fluid (DEF), Adblue®, a urea-water solution (UWS), an aqueous urea solution (e.g., AUS32, etc.), into the exhaust gas, so as to facilitate reduction of emission of undesirable components (e.g., nitrogen oxides ($NO_x$), etc.) in the exhaust gas.

The exhaust gas aftertreatment system 100 also includes a reductant delivery system 116. As is explained in more detail herein, the reductant delivery system 116 is configured to facilitate the introduction of the reductant into the exhaust gas. The reductant delivery system 116 includes a dosing module 118 (e.g., doser, etc.). The dosing module 118 is configured to facilitate passage of the reductant through the decomposition housing 114 and into the decomposition housing 114. As is explained in more detail herein, the dosing module 118 is configured to receive reductant, and in some embodiments, configured to receive air and reductant, and provide the reductant and/or air-reductant mixture into the decomposition housing 114 to facilitate treatment of the exhaust gas. The dosing module 118 may include an insulator interposed between a portion of the dosing module 118 and the portion of the decomposition housing 114 on which the dosing module 118 is mounted. In various embodiments, the dosing module 118 is coupled to the decomposition housing 114.

The reductant delivery system 116 also includes a reductant source 120 (e.g., reductant tank, etc.). The reductant source 120 is configured to contain reductant. The reductant source 120 is fluidly coupled to the dosing module 118 and configured to provide the reductant to the dosing module 118. The reductant source 120 may include multiple reductant sources 120 (e.g., multiple tanks connected in series or in parallel, etc.). The reductant source 120 may be, for example, a diesel exhaust fluid tank containing Adblue®.

The reductant delivery system 116 also includes a reductant pump 122 (e.g., supply unit, etc.). The reductant pump 122 is fluidly coupled to the reductant source 120 and the dosing module 118 and configured to receive the reductant from the reductant source 120 and to provide the reductant to the dosing module 118. The reductant pump 122 is used to pressurize the reductant from the reductant source 120 for delivery to the dosing module 118. In some embodiments, the reductant pump 122 is pressure controlled. In some embodiments, the reductant pump 122 is coupled to a chassis of a vehicle associated with the exhaust gas aftertreatment system 100.

In some embodiments, the reductant delivery system 116 also includes a reductant filter 124. The reductant filter 124 is fluidly coupled to the reductant source 120 and the reductant pump 122 and is configured to receive the reductant from the reductant source 120 and to provide the reductant to the reductant pump 122. The reductant filter 124 filters the reductant prior to the reductant being provided to internal components of the reductant pump 122. For example, the reductant filter 124 may inhibit or prevent the transmission of solids to the internal components of the reductant pump 122. In this way, the reductant filter 124 may facilitate prolonged desirable operation of the reductant pump 122.

The dosing module 118 includes at least one injector 126 (e.g., insertion device, etc.). The injector 126 is fluidly coupled to the reductant pump 122 and configured to receive the reductant from the reductant pump 122. The injector 126 is configured to dose (e.g., inject, insert, etc.) the reductant received by the dosing module 118 into the exhaust gas within the decomposition housing 114.

In some embodiments, the reductant delivery system 116 also includes an air pump 128 and an air source 130 (e.g., air intake, etc.). The air pump 128 is fluidly coupled to the air source 130 and is configured to receive air from the air source 130. The air pump 128 is fluidly coupled to the dosing module 118 and is configured to provide the air to the dosing module 118. The dosing module 118 is configured to mix the air and the reductant into an air-reductant mixture and to provide the air-reductant mixture to the injector 126 (e.g., for dosing into the exhaust gas within the decomposition housing 114, etc.). The injector 126 is fluidly coupled to the air pump 128 and configured to receive the air from the air pump 128. The injector 126 is configured to dose the air-reductant mixture into the exhaust gas within the decomposition housing 114. In some of these embodiments, the reductant delivery system 116 also includes an air filter 132. The air filter 132 is fluidly coupled to the air source 130 and the air pump 128 and is configured to receive the air from the air source 130 and to provide the air to the air pump 128. The air filter 132 is configured to filter the air prior to the air being provided to the air pump 128. In other embodiments, the reductant delivery system 116 does not include the air pump 128 and/or the reductant delivery system 116 does not include the air source 130. In such embodiments, the dosing module 118 is not configured to mix the reductant with air.

In various embodiments, the dosing module 118 is configured to receive air and reductant, and doses the air-reductant mixture into the decomposition housing 114. In various embodiments, the dosing module 118 is configured to receive reductant (and does not receive air), and doses the reductant into the decomposition housing 114. In various embodiments, the dosing module 118 is configured to receive reductant, and doses the reductant into the decomposition housing 114. In various embodiments, the dosing module 118 is configured to receive air and reductant, and doses the air-reductant mixture into the decomposition housing 114.

The exhaust gas aftertreatment system 100 also includes a controller 134 (e.g., control circuit, driver, etc.). The dosing module 118, the reductant pump 122, and the air pump 128 are electrically or communicatively coupled to the controller 134. The controller 134 is configured to control the dosing module 118 to dose the reductant and/or the air-reductant mixture into the decomposition housing 114. The controller 134 may also be configured to control the reductant pump 122 and/or the air pump 128 in order to control the reductant and/or the air-reductant mixture that is dosed into the decomposition housing 114.

The controller 134 includes a processing circuit 136. The processing circuit 136 includes a processor 138 and a memory 140. The processor 138 may include a microprocessor, an application-specific integrated circuit (ASIC), a field-programmable gate array (FPGA), etc., or combinations thereof. The memory 140 may include, but is not limited to, electronic, optical, magnetic, or any other storage or transmission device capable of providing a processor, ASIC, FPGA, etc. with program instructions. This memory 140 may include a memory chip, Electrically Erasable Programmable Read-Only Memory (EEPROM), Erasable Programmable Read Only Memory (EPROM), flash memory, or any other suitable memory from which the controller 134 can read instructions. The instructions may include code from any suitable programming language. The memory 140 may include various modules that include instructions which are configured to be implemented by the processor 138.

In various embodiments, the controller 134 is configured to communicate with a central controller 142 (e.g., engine control unit (ECU), engine control module (ECM), etc.) of an internal combustion engine having the exhaust gas aftertreatment system 100. In some embodiments, the central controller 142 and the controller 134 are integrated into a single controller.

In some embodiments, the central controller 142 is communicable with a display device (e.g., screen, monitor, touch screen, heads up display (HUD), indicator light, etc.). The display device may be configured to change state in response to receiving information from the central controller 142. For example, the display device may be configured to change between a static state and an alarm state based on a communication from the central controller 142. By changing state, the display device may provide an indication to a user of a status of the reductant delivery system 116.

In various embodiments, the exhaust gas aftertreatment system 100 also includes a mixer 144 (e.g., a swirl generating device, a vaned plate, etc., etc.). At least a portion of the mixer 144 is positioned within the decomposition housing 114. The mixer 144 is configured to receive the exhaust gas from the exhaust gas filtration device 112 (e.g., after particulates have been removed from the exhaust gas by the exhaust gas filtration device 112, etc.). The mixer 144 is also configured to receive the reductant and/or the air-reductant mixture from the injector 126. The mixer 144 is configured to facilitate swirling (e.g., tumbling, rotation, etc.) of the exhaust gas and mixing (e.g., combination, etc.) of the exhaust gas and the reductant or the air-reductant mixture so as to disperse the reductant within the exhaust gas downstream of the mixer 144. By dispersing the reductant within the exhaust gas (e.g., to obtain an increased uniformity index, etc.) using the mixer 144, reduction of emission of undesirable components in the exhaust gas is enhanced.

The housing assembly 104 also includes a distributing housing 146 (e.g., pressure regulator, flow plenum, flow balancer, flow balancing system, etc.). The distributing housing 146 is fluidly coupled to the decomposition housing 114 and is configured to receive exhaust gas from the decomposition housing 114 (e.g., after the reductant has been provided into the exhaust gas by the injector 126 and the reductant and the exhaust gas have been mixed by the mixer 144, etc.). In various embodiments, the distributing housing 146 is coupled to the decomposition housing 114. For example, the distributing housing 146 may be fastened, welded, riveted, or otherwise attached to the decomposition housing 114. In other embodiments, the distributing housing 146 is integrally formed with the decomposition housing 114.

The housing assembly 104 also includes a catalyst member housing 148 (e.g., body, etc.). The catalyst member housing 148 is fluidly coupled to the distributing housing 146 and is configured to receive exhaust gas from the distributing housing 146. In various embodiments, the catalyst member housing 148 is coupled to the distributing housing 146. For example, the catalyst member housing 148 may be fastened, welded, riveted, or otherwise attached to the distributing housing 146. In other embodiments, the catalyst member housing 148 is integrally formed with the distributing housing 146. The catalyst member housing 148 is located downstream of the distributing housing 146 and receives the exhaust gas from the distributing housing 146.

In various embodiments, the catalyst member housing 148 is centered on a catalyst member housing axis $\rho$. In other words, a center point of a cross-section of the catalyst member housing 148 is disposed on the catalyst member housing axis $\rho$ along a length of the catalyst member housing 148. The exhaust gas may be provided through the catalyst member housing 148 in a direction that is parallel to, or coincident with, the catalyst member housing axis $\rho$.

In various embodiments, the catalyst member housing axis $\rho$ is approximately parallel to the upstream housing axis $\lambda$ (e.g., when measured on a plane along which the catalyst member housing axis $\rho$ and the upstream housing axis $\lambda$ both extend, etc.).

In some of these embodiments, such as is shown in FIG. 1, the catalyst member housing axis $\rho$ is separated from the upstream housing axis $\lambda$. The distributing housing 146 therefore functions to redirect the exhaust gas approximately 180° (e.g., from a first direction along the upstream housing axis $\lambda$ to a second direction along the catalyst member housing axis $\rho$ that is separated from the first direction by approximately 180°, etc.). As a result of this arrangement, a length of the housing assembly 104 along the upstream housing axis $\lambda$ and/or a length of the housing assembly 104 along the catalyst member housing axis $\rho$ is significantly shorter than if, for example, the catalyst member housing axis $\rho$ was not separated from the upstream housing axis $\lambda$, the catalyst member housing axis $\rho$ was not approximately parallel to the upstream housing axis $\lambda$, and/or the distributing housing 146 did not function to redirect the exhaust gas approximately 180°. By decreasing a length of the housing assembly 104, a space claim of the housing assembly 104 may be reduced. As a result of having a reduced space claim, the housing assembly 104 may be capable of use in various applications where other aftertreatment systems would be incompatible (e.g., due to these other aftertreatment systems having excessive space claims, etc.).

In others of these embodiments, such as is shown in FIG. 2, the catalyst member housing axis $\rho$ is not separated from the upstream housing axis $\lambda$. As a result, the exhaust gas is not redirected by the distributing housing 146. Therefore, a backpressure of the exhaust gas may be decreased compared to other systems which require redirecting of the exhaust gas.

The exhaust gas aftertreatment system 100 also includes a first catalyst member 150 (e.g., first selective catalytic reduction (SCR) catalyst member, etc.). The first catalyst member 150 is configured to receive, treat, and output a first portion of the exhaust gas output by the distributing housing 146. At least a portion of the first catalyst member 150 is positioned within the catalyst member housing 148. A first portion of the exhaust gas received by the distributing housing 146 is provided by the distributing housing 146 to the first catalyst member 150 (e.g., via the catalyst member housing 148, etc.). As is explained in more detail herein, the first catalyst member 150 is configured to cause decomposition of components of the exhaust gas using the reductant (e.g., via catalytic reactions, etc.). Specifically, reductant that has been provided into the exhaust gas by the injector 126 undergoes the processes of evaporation, thermolysis, and hydrolysis to form non-$NO_x$ emissions within the distributing housing 146, the catalyst member housing 148, the first catalyst member 150, and/or the housing assembly 104. The first catalyst member 150 is configured to assist in the reduction of $NO_x$ emissions by accelerating a $NO_x$ reduction process between the reductant and the $NO_x$ of the exhaust gas into diatomic nitrogen, water, and/or carbon dioxide.

In various embodiments, the first catalyst member 150 is centered on a first catalyst member axis $J_1$. In other words, a center point of a cross-section of the first catalyst member 150 is disposed on the first catalyst member axis $J_1$ along a length of the first catalyst member 150. The exhaust gas may be provided through the first catalyst member 150 in a direction that is parallel to, or coincident with, the first catalyst member axis $J_1$. In various embodiments, the first catalyst member axis $J_1$ is approximately parallel to the upstream housing axis $\lambda$ (e.g., when measured on a plane along which the first catalyst member axis $J_1$ and the upstream housing axis $\lambda$ both extend, etc.). In these embodiments, the first catalyst member axis $J_1$ may be separated from the upstream housing axis $\lambda$.

The first catalyst member 150 also includes a first catalyst material 151 (e.g., catalyst metals, etc.). The first catalyst material 151 may include, for example, platinum, rhodium, palladium, or other similar materials. The first catalyst material 151 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the first catalyst material 151 is a ceramic catalyst material. In some embodiments, the first catalyst material 151 is an extruded catalyst material.

The exhaust gas aftertreatment system 100 also includes a second catalyst member 152 (e.g., second SCR catalyst member, etc.). The second catalyst member 152 is configured to receive, treat, and output a second portion of the exhaust gas output by the distributing housing 146. At least a portion of the second catalyst member 152 is positioned within the catalyst member housing 148. A second portion of the exhaust gas received by the distributing housing 146 is provided by the distributing housing 146 to the second catalyst member 152 (e.g., via the catalyst member housing 148, etc.). The second catalyst member 152 receives the second portion of the exhaust gas separately from the first portion of the exhaust gas that is received by the first catalyst member 150. As is explained in more detail herein, the second catalyst member 152 is configured to cause decomposition of components of the exhaust gas using the reductant (e.g., via catalytic reactions, etc.). Specifically, reductant that has been provided into the exhaust gas by the injector 126 undergoes the processes of evaporation, thermolysis, and hydrolysis to form non-$NO_x$ emissions within the distributing housing 146, the catalyst member housing 148, the second catalyst member 152, and/or the housing assembly 104. The second catalyst member 152 is configured to assist in the reduction of $NO_x$ emissions by accelerating a $NO_x$ reduction process between the reductant and the $NO_x$ of the exhaust gas into diatomic nitrogen, water, and/or carbon dioxide.

In various embodiments, the second catalyst member 152 is centered on a second catalyst member axis $J_2$. In other words, a center point of a cross-section of the second catalyst member 152 is disposed on the second catalyst member axis $J_2$ along a length of the second catalyst member 152. The exhaust gas may be provided through the second catalyst member 152 in a direction that is parallel to, or coincident with, the second catalyst member axis $J_2$. In various embodiments, the second catalyst member axis $J_2$ is approximately parallel to the upstream housing axis $\lambda$ (e.g., when measured on a plane along which the second catalyst member axis $J_2$ and the upstream housing axis $\lambda$ both extend, etc.). In these embodiments, the second catalyst member axis $J_2$ may be separated from the upstream housing axis $\lambda$. The second catalyst member axis $J_2$ may be approximately parallel to the first catalyst member axis $J_1$.

The second catalyst member 152 also includes a second catalyst material 153 (e.g., catalyst metals, etc.). The second catalyst material 153 may include, for example, platinum, rhodium, palladium, or other similar materials. The second catalyst material 153 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the second catalyst material 153 is a ceramic catalyst material. In some embodiments, the second catalyst material 153 is an extruded catalyst material.

The first portion of the exhaust gas is routed through the first catalyst member 150 in parallel with the second portion of the exhaust gas which is routed through the second catalyst member 152. By routing the first portion of the exhaust gas through the first catalyst member 150 and the second portion of the exhaust gas through the second catalyst member 152 in parallel, reduction of emission of undesirable components in the exhaust gas is more desirable. For example, the parallel routing of the exhaust gas through the first catalyst member 150 and the second catalyst member 152 may provide an increased capacity of the exhaust gas aftertreatment system 100 to treat exhaust gas and/or an increased efficiency of the exhaust gas aftertreatment system 100 in treating exhaust gas, when compared to other aftertreatment systems that do not include two catalyst members and that do not route exhaust gas through the two catalyst members in parallel.

The housing assembly 104 also includes an outlet housing 154 (e.g., body, etc.). The outlet housing 154 is fluidly coupled to the catalyst member housing 148 and is configured to receive exhaust gas from the catalyst member housing 148, the first catalyst member 150, and/or the second catalyst member 152. In various embodiments, the outlet housing 154 is coupled to the catalyst member housing 148. For example, the outlet housing 154 may be fastened, welded, riveted, or otherwise attached to the catalyst member housing 148. In other embodiments, the outlet housing 154 is integrally formed with the catalyst member housing 148.

The outlet housing 154 is located downstream of the catalyst member housing 148 and receives the first portion of the exhaust gas after flowing through the first catalyst member 150 and the second portion of the exhaust gas after flowing through the second catalyst member 152. In some embodiments, at least a portion of the first catalyst member 150 is positioned within the outlet housing 154 and/or at least a portion of the second catalyst member 152 is positioned within the outlet housing 154.

In various embodiments, the housing assembly 104 also includes a flow divider 156 (e.g., flow splitter, stream partition, etc.). The flow divider 156 is configured to balance (e.g., equalize, evenly divide, etc.) the first portion of the exhaust gas provided by the first catalyst member 150 to the outlet housing 154 and the second portion of the exhaust gas provided by the second catalyst member 152 to the outlet housing 154. For example, the first portion may be balanced with the second portion when a first parameter (e.g., flow rate, mass flow rate, volumetric flow rate, velocity, pressure, etc.) of the first portion is approximately equal to the second parameter (e.g., flow rate, mass flow rate, volumetric flow rate, velocity, pressure, etc.). By balancing the first portion and the second portion, reduction of emission of undesirable components in the exhaust gas is more desirable. For example, balancing the first portion and the second portion may decrease a backpressure of the exhaust gas aftertreatment system 100, thereby increasing an efficiency and/or output of an internal combustion engine having the exhaust gas aftertreatment system 100.

In some embodiments, the flow divider 156 is located upstream of the first catalyst member 150 and/or the second catalyst member 152. For example, the flow divider 156 may be located within the distributing housing 146. In this example, the flow divider 156 may separate a first portion of the exhaust gas provided to the first catalyst member 150 from a second portion of the exhaust gas provided to the second catalyst member 152 after balancing the first portion and the second portion. In another example, a portion of the flow divider 156 may be coupled to an inlet of the first catalyst member 150 and another portion of the flow divider 156 may be coupled to an inlet of the second catalyst member 152.

In some embodiments, the flow divider 156 is located downstream of the first catalyst member 150 and/or the second catalyst member 152. For example, a portion of the flow divider 156 may be coupled to an outlet of the first catalyst member 150 and another portion of the flow divider 156 may be coupled to an outlet of the second catalyst member 152.

The exhaust gas aftertreatment system 100 also includes a downstream exhaust gas conduit 158 (e.g., line, pipe, etc.). The downstream exhaust gas conduit 158 is fluidly coupled to the outlet housing 154 and is configured to receive the exhaust gas from the outlet housing 154. In some embodiments, the downstream exhaust gas conduit 158 is coupled to the outlet housing 154. In other embodiments, the downstream exhaust gas conduit 158 is integrally formed with the outlet housing 154.

The first catalyst member 150 includes a first catalyst member inlet 159. The second catalyst member 152 includes a second catalyst member inlet 160. The first catalyst member inlet 159 and the second catalyst member inlet 160 are located where the first portion of the exhaust gas (e.g., that is received, treated, and output by the first catalyst member 150, etc.) and the second portion of the exhaust gas (e.g., that is received, treated, and output by the second catalyst member 152, etc.) are separated. The first catalyst member inlet 159 and the second catalyst member inlet 160 are disposed along a catalyst member inlet plane 161.

The first catalyst member 150 also includes a first catalyst member outlet 162. The first catalyst member outlet 162 is located at an average location along the first catalyst member axis $J_1$ at which the first portion is output from the first catalyst material 151 (e.g., where the flow divider 156 is upstream of the first catalyst material 151, etc.) or the flow divider 156 (e.g., where the flow divider 156 is downstream of the first catalyst material 151, etc.). The first catalyst member outlet 162 is disposed along a first catalyst member outlet plane 163. The first catalyst member outlet plane 163 is orthogonal to the first catalyst member axis $J_1$.

The first catalyst member 150 is also defined by a first catalyst member separation length $L_1$ from the catalyst member inlet plane 161 to the first catalyst member outlet plane 163. By minimizing the first catalyst member separation length $L_1$, a length of the housing assembly 104 along the first catalyst member axis $J_1$ may be decreased. As a result, a space claim of the housing assembly 104 may be decreased, thus making the housing assembly 104 more desirable.

The second catalyst member 152 also includes a second catalyst member outlet 164. The second catalyst member outlet 164 is located at an average location along the second catalyst member axis $J_2$ at which the second portion is output from the second catalyst material 153 (e.g., where the flow divider 156 is upstream of the second catalyst material 153, etc.) or the flow divider 156 (e.g., where the flow divider 156 is downstream of the second catalyst material 153, etc.). The second catalyst member outlet 164 is disposed along a second catalyst member outlet plane 165. The second catalyst member outlet plane 165 is orthogonal to the second catalyst member axis $J_2$.

The second catalyst member 152 is also defined by a second catalyst member separation length $L_2$ from the catalyst member inlet plane 161 to the second catalyst member outlet plane 165. By minimizing the second catalyst member separation length $L_2$, a length of the housing assembly 104 along the second catalyst member axis $J_2$ may be decreased. As a result, a space claim of the housing assembly 104 may be decreased, thus making the housing assembly 104 more desirable.

In contrast to the catalyst member inlet plane 161, which is the same for both the first catalyst member 150 and the second catalyst member 152, the first catalyst member outlet plane 163 is specific to the first catalyst member 150 and the second catalyst member outlet plane 165 is specific to the second catalyst member 152. As a result, the first catalyst member separation length $L_1$ and the second catalyst member separation length $L_2$ may differ.

By minimizing a difference between the first catalyst member separation length $L_1$ and the second catalyst member separation length $L_2$, and minimizing both the first catalyst member separation length $L_1$ and the second catalyst member separation length $L_2$, the space claim of the housing assembly 104 is minimized. The desirability of the housing assembly 104 may increase as the space claim of the housing assembly 104 decreases (e.g., due to an ability of the housing assembly 104 to be utilized in a larger number of applications, etc.). The flow divider 156 functions to minimize backpressure that would otherwise increase as the difference between the first catalyst member separation length $L_1$ and the second catalyst member separation length $L_2$ decreases. In systems without a flow divider, the flow of exhaust through parallel catalysts cannot be balanced and the catalysts have to be differently located so as to mitigate excessive backpressure. Through the use of the flow divider 156 to balance the flow of the exhaust gas out of the first catalyst member 150 with the flow of the exhaust gas out of the second catalyst member 152, the first catalyst member separation length $L_1$ can be the same as the second catalyst member separation length $L_2$ without providing excess backpressure.

The exhaust gas aftertreatment system 100 also includes an outlet sampling system 166. The outlet sampling system 166 is configured to facilitate sampling of the exhaust gas within the outlet housing 154 (e.g., after the first portion of the exhaust gas has flowed out of the first catalyst member outlet 162 and the second portion of the exhaust gas has flowed out of the second catalyst member outlet 164). As is explained in more detail herein, the outlet sampling system 166 does not protrude into the downstream exhaust gas conduit 158. In contrast, other systems sample exhaust gas using probes or conduits that protrude across a flow path of the exhaust gas. These probes and conduits used in other systems may provide inaccurate measurements and may be prone to failure. By avoiding these shortcomings, the outlet sampling system 166 may enable the exhaust gas aftertreatment system 100 to be more desirable than other systems.

The exhaust gas aftertreatment system 100 also includes an outlet sensor 168 (e.g., probe, etc.). The outlet sensor 168 is exposed to the exhaust gas sampled by the outlet sampling system 166. The outlet sensor 168 does not protrude into the downstream exhaust gas conduit 158 or the outlet housing 154. Instead, the outlet sensor 168 is positioned so as to sample exhaust gas within the outlet sampling system 166.

The outlet sensor 168 is electrically or communicatively coupled to the controller 134. The controller 134 is configured to receive a signal from the outlet sensor 168 and determine, based on the signal, a value (e.g., reading, etc.) of a property (e.g., $NO_x$ concentration, $O_2$ concentration, temperature, pressure, quality, velocity, etc.) of the exhaust gas sampled by the outlet sampling system 166. The controller 134 may then control operation of the exhaust gas aftertreatment system 100 based on the reading of the property. For example, the controller 134 may compare the reading of the property to a threshold (e.g., maximum desirable amount of the property, minimum desirable amount of the property, etc.) and then control operation of the exhaust gas aftertreatment system 100 based on the comparison. In some applications, the controller 134 control operation of the exhaust gas aftertreatment system 100 by causing the dosing module 118 to dose additional reductant into the decomposition housing 114.

While the exhaust gas aftertreatment system 100 has been shown and described in the context of use with a diesel internal combustion engine, it is understood that the exhaust gas aftertreatment system 100 may be used with other internal combustion engines, such as gasoline internal combustion engines, hybrid internal combustion engines, propane internal combustion engines, dual-fuel internal combustion engines, and other similar internal combustion engines.

III. Example Housing Assembly

FIGS. 3-12 illustrate the housing assembly 104 according to various embodiments. The intake body 106 includes an intake body inlet 200 (e.g., fitting, connector, etc.). The intake body inlet 200 is coupled to or integrally formed with the upstream exhaust gas conduit 102. For example, the upstream exhaust gas conduit 102 may be inserted into the intake body inlet 200 and the intake body inlet 200 may be coupled to the upstream exhaust gas conduit 102 using a clamp (e.g., band clamp, etc.).

Figure 9:
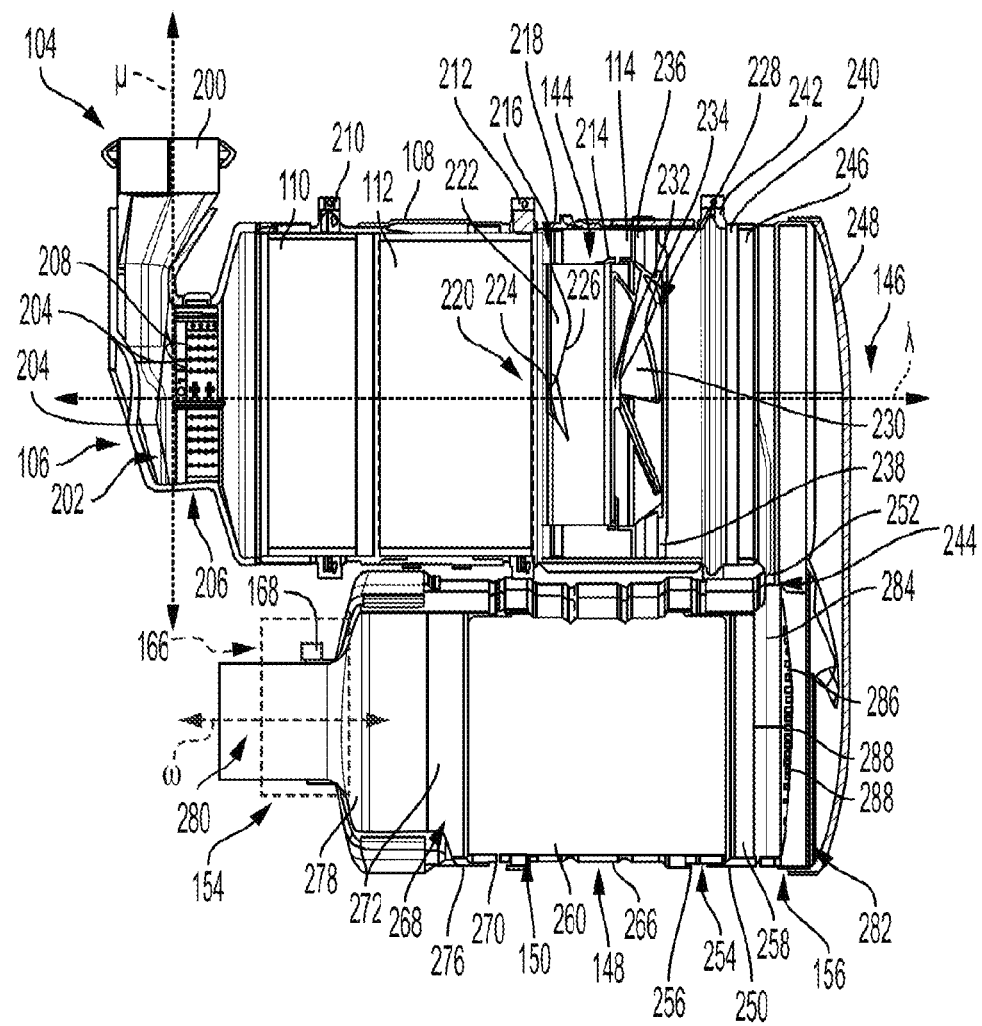
FIG. 9 is another cross-sectional view of the housing assembly shown in FIG. 3 taken along plane A-A in FIG. 7.

In various embodiments, such as is shown in FIG. 9, the intake body inlet 200 is centered on an intake body inlet center axis μ. In other words, a center point of a cross-section of the intake body inlet 200 is disposed on the intake body inlet center axis μ along a length of the intake body inlet 200. The exhaust gas may be provided through the intake body inlet 200 in a direction that is parallel to, or coincident with, the intake body inlet center axis μ.

In various embodiments, the intake body inlet center axis μ is approximately orthogonal to the upstream housing axis λ (e.g., when measured on a plane along which the intake body inlet center axis μ and the upstream housing axis λ both extend, etc.). Such an arrangement of the intake body inlet 200 may facilitate further reduction of a length of the housing assembly 104 along the upstream housing axis λ and/or a length of the housing assembly 104 along the catalyst member housing axis ρ. This may further reduce a space claim of the housing assembly 104. In some embodiments, the intake body inlet center axis μ is coincident with the upstream housing axis λ.

The exhaust gas aftertreatment system 100 also includes a perforated panel 202 (e.g., plate, etc.). The perforated panel 202 is located within the intake body 106. The perforated panel 202 includes a plurality of perforated panel perforations 204 (e.g., openings, holes, apertures, etc.). At least a portion of the exhaust gas provided by the intake body 106 to the oxidation catalyst 110 flows through the perforated panel 202 via the perforated panel perforations 204 prior to being provided to the oxidation catalyst 110. The perforated panel 202 is configured to facilitate redirection of the exhaust gas from flowing along the intake body inlet center axis μ to flowing along the upstream housing axis λ.

The exhaust gas aftertreatment system 100 also includes a straightener 206 (e.g., flow straightener, aperture plate, etc.). The straightener 206 is located within the intake body 106. The straightener 206 includes a plurality of straightener perforations 208 (e.g., openings, holes, apertures, etc.). At least a portion of the exhaust gas provided by the intake body 106 to the oxidation catalyst 110 flows through the straightener 206 via the straightener perforations 208 prior to being provided to the oxidation catalyst 110. The straightener 206 is configured to facilitate straightening of the exhaust gas prior to the exhaust gas being provided to the oxidation catalyst 110. As a result of the straightening facilitated by the straightener 206, turbulence of the exhaust gas flowing into the oxidation catalyst 110 is reduced and a backpressure of the exhaust gas aftertreatment system 100 is reduced, thereby making the exhaust gas aftertreatment system 100 more desirable.

The exhaust gas aftertreatment system 100 also includes an inlet band clamp 210 (e.g., strap, hose clamp, etc.). The inlet band clamp 210 is configured to facilitate coupling of the intake body 106 and the upstream housing 108. For example, the inlet band clamp 210 may overlap a first flange of the intake body 106 and a second flange of the upstream housing 108 and be tightened to cause the intake body 106 and the upstream housing 108 to be coupled.

Through the use of the inlet band clamp 210, assembly and/or servicing of the housing assembly 104 may be simplified. For example, the perforated panel 202 and/or the straightener 206 can be inserted within the intake body 106 before the intake body 106 and the upstream housing 108 are coupled. This may simplify assembly of the intake body 106, thereby making the exhaust gas aftertreatment system 100 more desirable. In another example, the oxidation catalyst 110 and the exhaust gas filtration device 112 can be removed from the upstream housing 108 when the inlet band clamp 210 is removed and the intake body 106 is separated from the upstream housing 108 and without separating the upstream housing 108 from the decomposition housing 114 or separating the decomposition housing 114 from the distributing housing 146. This may simplify removal of the oxidation catalyst 110 and/or the exhaust gas filtration device 112, thereby making the exhaust gas aftertreatment system 100 more desirable.

The exhaust gas aftertreatment system 100 also includes a decomposition housing band clamp 212 (e.g., strap, hose clamp, etc.). The decomposition housing band clamp 212 is configured to facilitate coupling of the upstream housing 108 and the decomposition housing 114. For example, the decomposition housing band clamp 212 may overlap a first flange of the upstream housing 108 and a second flange of the decomposition housing 114 and be tightened to cause the upstream housing 108 and the decomposition housing 114 to be coupled.

Through the use of the decomposition housing band clamp 212, assembly and/or servicing of the housing assembly 104 may be simplified. For example, the mixer 144 can be inserted within the decomposition housing 114 before the decomposition housing 114 and the upstream housing 108 are coupled. This may simplify assembly of the decomposition housing 114, thereby making the exhaust gas aftertreatment system 100 more desirable. In another example, the oxidation catalyst 110 and the exhaust gas filtration device 112 can be inserted into the upstream housing 108 when the decomposition housing band clamp 212 is removed and the upstream housing 108 is separated from the decomposition housing 114 and without separating the upstream housing 108 from the intake body 106. This may simplify installation of the oxidation catalyst 110 and/or the exhaust gas filtration device 112, thereby making the exhaust gas aftertreatment system 100 more desirable.

The mixer 144 includes a mixer housing 214 (e.g., shell, body, etc.). The exhaust gas flows through the mixer 144 via the mixer housing 214. The mixer housing 214 includes a mixer housing opening 215 (e.g., aperture, hole, etc.). The mixer housing opening 215 receives the reductant or the air-reductant mixture from the injector 126. The mixer 144 may, for example, include a flow guide (e.g., cone, etc.) that extends from the mixer housing 214 to the decomposition housing 114 and extends around the injector 126 and the mixer housing opening 215. The flow guide may facilitate provision of the reductant or the air reductant mixture from the injector 126 into the mixer housing 214 via the mixer housing opening 215. The flow guide may include perforations to receive exhaust gas that may assist in propelling the reductant or the air-reductant mixture into the mixer housing 214.

The mixer 144 also includes a first mixer flange 216 (e.g., rib, ring, etc.). The first mixer flange 216 supports (e.g., suspends, etc.) the mixer 144 within the decomposition housing 114. The first mixer flange 216 is disposed upstream of the injector 126. In various embodiments, the first mixer flange 216 is coupled to the mixer housing 214 and is coupled to the decomposition housing 114. In some embodiments, the first mixer flange 216 is integrally formed with the mixer housing 214 (e.g., and coupled to the decomposition housing 114, and integrally formed with the decomposition housing 114). In some embodiments, the first mixer flange 216 is integrally formed with the decomposition housing 114 (e.g., and coupled to the mixer housing 214, and integrally formed with the mixer housing 214).

In various embodiments, the first mixer flange 216 includes at least one mixer flange aperture 218 (e.g., hole, opening, window, etc.). The mixer flange apertures 218 facilitate flow of the exhaust gas through the first mixer flange 216. In this way, the exhaust gas can flow between the mixer housing 214 and the decomposition housing 114. This exhaust gas may heat the mixer housing 214, thereby mitigating formation of deposits (e.g., reductant deposits, solidified reductant, etc.) on the mixer housing 214. Additionally, this exhaust gas may assist in propelling the reductant into the mixer housing 214 via the mixer housing opening 215.

The mixer 144 also includes an upstream mixing plate 220 (e.g., vane plate, baffle plate, etc.). The upstream mixing plate 220 is located upstream of the mixer housing opening 215. The upstream mixing plate 220 includes a plurality of upstream mixing plate vanes 222 (e.g., baffles, guides, etc.) that extend from an upstream mixing plate hub 224 (e.g., base, etc.) of the upstream mixing plate 220. Adjacent pairs of the upstream mixing plate vanes 222 define upstream mixing plate apertures 226 (e.g., holes, openings, etc.). The exhaust gas flows through the upstream mixing plate 220 via the upstream mixing plate apertures 226. The upstream mixing plate vanes 222 are angled relative to the upstream mixing plate hub 224 which causes the exhaust gas to swirl as the exhaust gas flows through the upstream mixing plate 220. This swirl enhances mixing of the reductant or the air-reductant mixture downstream of the upstream mixing plate 220.

The mixer 144 also includes a downstream mixing plate 228 (e.g., vane plate, baffle plate, etc.). The downstream mixing plate 228 is located downstream of the mixer housing opening 215. The downstream mixing plate 228 includes a plurality of downstream mixing plate vanes 230 (e.g., baffles, guides, etc.) that extend from a downstream mixing plate hub 232 (e.g., base, etc.) of the downstream mixing plate 228. Adjacent pairs of the downstream mixing plate vanes 230 define downstream mixing plate apertures 234 (e.g., holes, openings, etc.). The exhaust gas flows through the downstream mixing plate 228 via the downstream mixing plate apertures 234. The downstream mixing plate vanes 230 are angled relative to the downstream mixing plate hub 232 which causes the exhaust gas to swirl as the exhaust gas flows through the downstream mixing plate 228. This swirl enhances mixing of the reductant or the air-reductant mixture downstream of the downstream mixing plate 228.

The mixer 144 also includes a second mixer flange 236 (e.g., rib, ring, etc.). The second mixer flange 236 supports (e.g., suspends, etc.) the mixer 144 within the decomposition housing 114. The second mixer flange 236 is disposed downstream of the injector 126. In various embodiments, the second mixer flange 236 is coupled to the mixer housing 214 and is coupled to the decomposition housing 114. In some embodiments, the second mixer flange 236 is integrally formed with the mixer housing 214 (e.g., and coupled to the decomposition housing 114, and integrally formed with the decomposition housing 114). In some embodiments, the second mixer flange 236 is integrally formed with the decomposition housing 114 (e.g., and coupled to the mixer housing 214, and integrally formed with the mixer housing 214).

The mixer 144 also includes a third mixer flange 238 (e.g., rib, ring, etc.). The third mixer flange 238 supports (e.g., suspends, etc.) the mixer 144 within the decomposition housing 114. The third mixer flange 238 is disposed downstream of the second mixer flange 236. In various embodiments, the third mixer flange 238 is coupled to the mixer housing 214 and is coupled to the decomposition housing 114. In some embodiments, the third mixer flange 238 is integrally formed with the mixer housing 214 (e.g., and coupled to the decomposition housing 114, and integrally formed with the decomposition housing 114). In some embodiments, the third mixer flange 238 is integrally formed with the decomposition housing 114 (e.g., and coupled to the mixer housing 214, and integrally formed with the mixer housing 214).

The distributing housing 146 includes an inlet coupler 240 (e.g., spacer, etc.). The inlet coupler 240 is coupled to the decomposition housing 114. In various embodiments, the exhaust gas aftertreatment system 100 also includes a distributing housing band clamp 242 (e.g., strap, hose clamp, etc.). The distributing housing band clamp 242 is configured to facilitate coupling of the decomposition housing 114 and the distributing housing 146. For example, the distributing housing band clamp 242 may overlap a first flange of the decomposition housing 114 and the inlet coupler 240 and be tightened to cause the decomposition housing 114 and the inlet coupler 240 to be coupled.

Through the use of the distributing housing band clamp 242, assembly and/or servicing of the housing assembly 104 may be simplified. For example, the mixer 144 can be inserted within the decomposition housing 114 before the decomposition housing 114 and the inlet coupler 240 are coupled. This may simplify assembly of the decomposition housing 114, thereby making the exhaust gas aftertreatment system 100 more desirable.

The distributing housing 146 also includes a distributing housing flanged body 244 (e.g., flanged member, etc.). As is explained in more detail herein, the distributing housing flanged body 244 facilitates coupling of the distributing housing 146 to the decomposition housing 114 and the catalyst member housing 148.

The distributing housing flanged body 244 includes a distributing housing inlet flange 246 (e.g., ring, annular flange, rib, wall, etc.). The distributing housing 146 receives the exhaust gas from the decomposition housing 114 through the distributing housing inlet flange 246. In various embodiments, the distributing housing inlet flange 246 is coupled to the inlet coupler 240. For example, the distributing housing inlet flange 246 may be fastened, welded, riveted, or otherwise attached to the inlet coupler 240. In other embodiments, the distributing housing inlet flange 246 is integrally formed with the inlet coupler 240.

The distributing housing flanged body 244 also includes a shell 248 (e.g., wall, cap, etc.). After flowing into the distributing housing 146 via the distributing housing inlet flange 246, the shell 248 functions to direct the exhaust gas towards the catalyst member housing 148. In various embodiments, the shell 248 is coupled to the distributing housing inlet flange 246. For example, the shell 248 may be fastened, welded, riveted, or otherwise attached to the distributing housing inlet flange 246. In other embodiments, the shell 248 is integrally formed with the distributing housing inlet flange 246.

The distributing housing flanged body 244 also includes an outlet flange 250 (e.g., ring, rib, wall, etc.). As is explained in more detail herein, the outlet flange 250 facilitates coupling of the distributing housing 146 to the catalyst member housing 148. In various embodiments, the outlet flange 250 is coupled to the shell 248. For example, the outlet flange 250 may be fastened, welded, riveted, or otherwise attached to the shell 248. In other embodiments, the outlet flange 250 is integrally formed with the shell 248.

The distributing housing flanged body 244 also includes a joining wall 252 (e.g., flange, rib, etc.). The joining wall 252 facilitates separation of the decomposition housing 114 and the catalyst member housing 148. In various embodiments, the joining wall 252 is coupled to the distributing housing inlet flange 246 and/or the outlet flange 250. For example, the joining wall 252 may be fastened, welded, riveted, or otherwise attached to the distributing housing inlet flange 246 and/or the outlet flange 250. In other embodiments, the joining wall 252 is integrally formed with the distributing housing inlet flange 246 and/or the outlet flange 250.

The catalyst member housing 148 includes a first support 254. The first support 254 is configured to facilitate coupling of the catalyst member housing 148 to the distributing housing 146 while also supporting the first catalyst member 150 and the second catalyst member 152 within the catalyst member housing 148.

The first support 254 includes a first housing support flange 256 (e.g., rib, wall, etc.). In various embodiments, the first housing support flange 256 is coupled to the outlet flange 250. For example, the first housing support flange 256 may be fastened, welded, riveted, or otherwise attached to the outlet flange 250. In other embodiments, the first housing support flange 256 is integrally formed with the outlet flange 250.

The first support 254 also includes a first support first catalyst member flange 258 (e.g., rib, wall, etc.). As is explained in more detail herein, the first support first catalyst member flange 258 is configured to support the first catalyst member 150 within the catalyst member housing 148.

The first catalyst member 150 includes a first casing 260 (e.g., shell, skin, etc.). The first casing 260 interfaces with the first support first catalyst member flange 258. In some embodiments, the first casing 260 is coupled to the first support first catalyst member flange 258. For example, the first casing 260 may be fastened, welded, riveted, or otherwise attached to the first support first catalyst member flange 258. In other embodiments, the first casing 260 is integrally formed with the first support first catalyst member flange 258.

The first support 254 also includes a first support second catalyst member flange 262 (e.g., rib, wall, etc.). As is explained in more detail herein, the first support second catalyst member flange 262 is configured to support the second catalyst member 152 within the catalyst member housing 148. The first support 254 is configured such that the first support second catalyst member flange 262 is spaced apart from the first support first catalyst member flange 258. In some embodiments, the first support 254 is configured such that the catalyst member housing axis ρ extends between the first catalyst member 150 and the second catalyst member 152.

The second catalyst member 152 includes a second casing 264 (e.g., shell, skin, etc.). The second casing 264 interfaces with the first support second catalyst member flange 262. In some embodiments, the second casing 264 is coupled to the first support second catalyst member flange 262. For example, the second casing 264 may be fastened, welded, riveted, or otherwise attached to the first support second catalyst member flange 262. In other embodiments, the second casing 264 is integrally formed with the first support second catalyst member flange 262.

The catalyst member housing 148 also includes an outer wall 266 (e.g., casing, etc.). The outer wall 266 partially covers the first catalyst member 150 and the second catalyst member 152. The first support 254 is configured to support the first catalyst member 150 above the outer wall 266 such that an air gap extends at least partially between the outer wall 266 and the first catalyst member 150. In various embodiments, the outer wall 266 is coupled to the first housing support flange 256. For example, the outer wall 266 may be fastened, welded, riveted, or otherwise attached to the first housing support flange 256. In other embodiments, the outer wall 266 is integrally formed with the first housing support flange 256.

The catalyst member housing 148 includes a second support 268. The second support 268 is configured to facilitate coupling of the catalyst member housing 148 to the outlet housing 154 while also supporting the first catalyst member 150 and the second catalyst member 152 within the catalyst member housing 148.

The second support 268 includes a second housing support flange 270 (e.g., rib, wall, etc.). As is explained in more detail herein, the second housing support flange 270 is configured to facilitate coupling of the second support 268 to the outlet housing 154.

The second support 268 also includes a second support first catalyst member flange 272 (e.g., rib, wall, etc.). As is explained in more detail herein, the second support first catalyst member flange 272 is configured to support the first catalyst member 150 within the catalyst member housing 148

The first casing 260 interfaces with the second support first catalyst member flange 272. In some embodiments, the first casing 260 is coupled to the second support first catalyst member flange 272. For example, the first casing 260 may be fastened, welded, riveted, or otherwise attached to the second support first catalyst member flange 272. In other embodiments, the first casing 260 is integrally formed with the second support first catalyst member flange 272.

The second support 268 also includes a second support second catalyst member flange 274 (e.g., rib, wall, etc.). As is explained in more detail herein, the second support second catalyst member flange 274 is configured to support the second catalyst member 152 within the catalyst member housing 148. The second support 268 is configured such that the second support second catalyst member flange 274 is spaced apart from the second support first catalyst member flange 272. In some embodiments, the second support 268 is configured such that the catalyst member housing axis ρ extends between the first catalyst member 150 and the second catalyst member 152.

The second casing 264 interfaces with the second support second catalyst member flange 274. In some embodiments, the second casing 264 is coupled to the second support second catalyst member flange 274. For example, the second casing 264 may be fastened, welded, riveted, or otherwise attached to the second support second catalyst member flange 274. In other embodiments, the second casing 264 is integrally formed with the second support second catalyst member flange 274.

The outlet housing 154 includes an outlet housing flange 276 (e.g., wall, rib, etc.). In various embodiments, the outlet housing flange 276 is coupled to the second housing support flange 270. For example, the outlet housing flange 276 may be fastened, welded, riveted, or otherwise attached to the second housing support flange 270. In other embodiments, the outlet housing flange 276 is integrally formed with the second housing support flange 270.

The outlet housing 154 also includes an outlet housing body 278 (e.g., wall, shell, etc.). The outlet housing body 278 is configured to collect the exhaust gas flowing from both the first catalyst member 150 and the second catalyst member 152 and provide the exhaust gas to the downstream exhaust gas conduit 158. In various embodiments, the outlet housing body 278 is coupled to the outlet housing flange 276. For example, the outlet housing body 278 may be fastened, welded, riveted, or otherwise attached to the outlet housing flange 276. In other embodiments, the outlet housing body 278 is integrally formed with the outlet housing flange 276.

The outlet sampling system 166 includes an outlet housing fitting 280 (e.g., coupler, etc.). The outlet housing fitting 280 is configured to provide the exhaust gas from the outlet housing body 278 to the downstream exhaust gas conduit 158. In various embodiments, the outlet housing fitting 280 is coupled to the outlet housing body 278. For example, the outlet housing fitting 280 may be fastened, welded, riveted, or otherwise attached to the outlet housing body 278. In other embodiments, the outlet housing fitting 280 is integrally formed with the outlet housing body 278.

The outlet housing fitting 280 is centered on an outlet housing fitting axis $\omega$. In other words, a center point of a cross-section of the outlet housing fitting 280 is disposed on the outlet housing fitting axis $\omega$ along a length of the outlet housing fitting 280. The exhaust gas may be provided through the outlet housing fitting 280 in a direction that is parallel to, or coincident with, the outlet housing fitting axis $\omega$. In various embodiments, the outlet housing fitting axis $\omega$ is approximately parallel to the catalyst member housing axis $\rho$ (e.g., when measured on a plane along which the outlet housing fitting axis $\omega$ and the catalyst member housing axis $\rho$ both extend, etc.).

The flow divider 156 includes a first endcap 282 (e.g., plate, etc.). As is explained in more detail herein, the first endcap 282 is configured to control flow of the exhaust gas out of the first catalyst member 150.

The first endcap 282 includes a first endcap flange 284 (e.g., wall, rib, etc.). In various embodiments, the first endcap flange 284 is coupled to the first support first catalyst member flange 258. For example, the first endcap flange 284 may be fastened, welded, riveted, or otherwise attached to the first support first catalyst member flange 258. In other embodiments, the first endcap flange 284 is integrally formed with the first support first catalyst member flange 258.

The first endcap 282 also includes a first endcap panel 286 (e.g., plate, face, etc.). The first endcap panel 286 extends across the first support first catalyst member flange 258 and therefore across an inlet face of the first catalyst member 150, in some embodiments. In various embodiments, the first endcap panel 286 is coupled to the first endcap flange 284. For example, the first endcap panel 286 may be fastened, welded, riveted, or otherwise attached to the first endcap flange 284. In other embodiments, the first endcap panel 286 is integrally formed with the first endcap flange 284.

The first endcap 282 also includes a plurality of first apertures 288 (e.g., openings, perforations, etc.). The first apertures 288 facilitate flow of the exhaust gas through the first endcap 282. In various embodiments, each of the first apertures 288 extends through the first endcap panel 286. In other embodiments, at least one of the first apertures 288 extends through the first endcap flange 284.

The first apertures 288 are configured to receive the exhaust gas from the distributing housing 146 and facilitate passage of a first portion of the exhaust gas through the first endcap 282 and to the outlet housing 154. The first portion of the exhaust gas is treated by the first catalyst member 150. The first apertures 288 each define a first aperture area $A_1$. The first aperture area $A_1$ of each of the first apertures 288 may be different from, or the same as, the first aperture areas $A_1$ of the others of the first apertures 288. In various embodiments, the first aperture areas $A_1$ are each approximately in a range of 0.50 inches squared ($in^2$) to 2.50 $in^2$, inclusive (e.g., 0.475 $in^2$, 0.50 $in^2$, 1.0 $in^2$, 1.8 $in^2$, 2.50 $in^2$, 2.625 $in^2$, etc.). As used herein, a range of X to Y includes X, Y, values between X and Y, and values approximately equal to X and approximately equal to Y. In some embodiments, the first aperture areas $A_1$ of each of the first apertures 288 are equal.

A sum of the first aperture areas $A_1$ for all of the first apertures 288 defines a first total area $\varepsilon$ of the first endcap 282. This first total area $\varepsilon$ is the entirety of the area in the first endcap 282 that the exhaust gas can flow through towards the outlet housing 154.

The flow divider 156 includes a second endcap 290 (e.g., plate, etc.). As is explained in more detail herein, the second endcap 290 is configured to control flow of the exhaust gas out of the second catalyst member 152.

The second endcap 290 includes a second endcap flange 292 (e.g., wall, rib, etc.). In various embodiments, the second endcap flange 292 is coupled to the first support second catalyst member flange 262. For example, the second endcap flange 292 may be fastened, welded, riveted, or otherwise attached to the first support second catalyst member flange 262. In other embodiments, the second endcap flange 292 is integrally formed with the first support second catalyst member flange 262.

The second endcap 290 also includes a second endcap panel 294 (e.g., plate, face, etc.). The second endcap panel 294 extends across the first support second catalyst member flange 262 and therefore across an inlet face of the second catalyst member 152, in some embodiments. In various embodiments, the second endcap panel 294 is coupled to the second endcap flange 292. For example, the second endcap panel 294 may be fastened, welded, riveted, or otherwise attached to the second endcap flange 292. In other embodiments, the second endcap panel 294 is integrally formed with the second endcap flange 292.

The second endcap 290 also includes a plurality of second apertures 296 (e.g., openings, perforations, etc.). The second apertures 296 facilitate flow of the exhaust gas through the second endcap 290. In various embodiments, each of the second apertures 296 extends through the second endcap panel 294. In other embodiments, at least one of the second apertures 296 extends through the second endcap flange 292.

The second apertures 296 are configured to receive the exhaust gas from the distributing housing 146 and facilitate passage of a second portion of the exhaust gas through the second endcap 290 and to the outlet housing 154. The second portion of the exhaust gas is treated by the second catalyst member 152. The second apertures 296 each define a second aperture area $A_2$. The second aperture area $A_2$ of each of the second apertures 296 may be different from, or the same as, the second aperture areas $A_2$ of the others of the second apertures 296. Additionally, the second aperture area $A_2$ of each of the second apertures 296 may be different from, or the same as, the first aperture areas $A_1$ of the first apertures 288.

In various embodiments, the second aperture areas $A_2$ are each approximately in a range of 0.50 in² to 2.50 in², inclusive (e.g., 0.475 in², 0.50 in², 1.0 in², 1.8 in², 2.50 in², 2.625 in², etc.). In some embodiments, the second aperture area areas $A_2$ of each of the second apertures 296 are equal.

A sum of the second aperture areas $A_2$ for all of the second apertures 296 defines a second total area $\eta$ of the second endcap 290. This second total area $\eta$ is the entirety of the area in the second endcap 290 that the exhaust gas can flow through towards the outlet housing 154.

In various embodiments, the second total area $\eta$ is not equal to the first total area. A ratio, $\psi$, of the first total area $\varepsilon$ to the second total area $\eta$ ($\psi=\varepsilon/\eta$) is selected such that flow of the exhaust gas is balanced between the first catalyst member 150 and the second catalyst member 152. As a result, the first catalyst member 150 and the second catalyst member 152 receive the same amount (e.g., volume per unit time, etc.) of the exhaust gas. Balancing the flow of the exhaust gas between the first catalyst member 150 and the second catalyst member 152 mitigates backpressure on an internal combustion engine having the exhaust gas aftertreatment system 100.

In various embodiments, the ratio $\psi$ is approximately in a range of 1.25 to 10, inclusive (e.g., 1.1875, 1.25, 2, 4, 10, 10.5, etc.).

Figure 10:
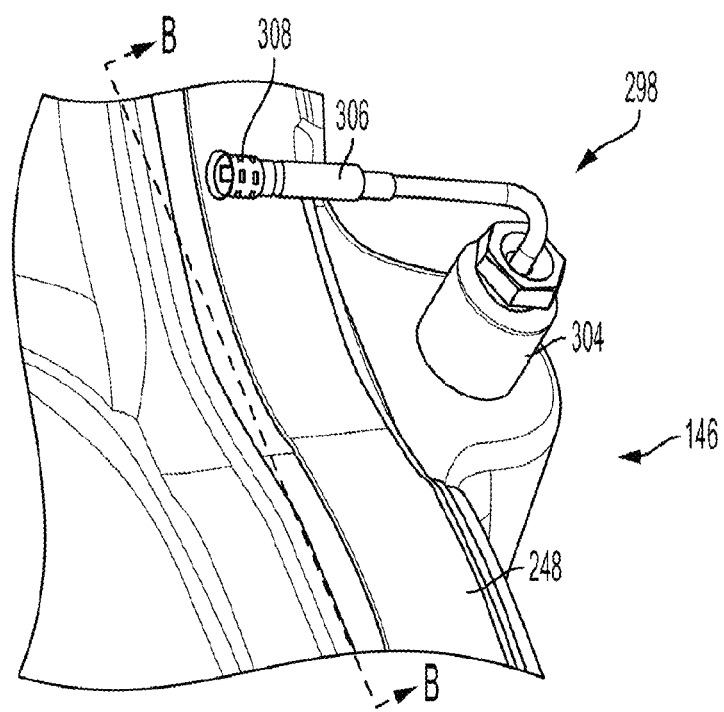
FIG. 10 is a perspective view of a portion of the housing assembly shown in FIG. 3.
Figure 11:
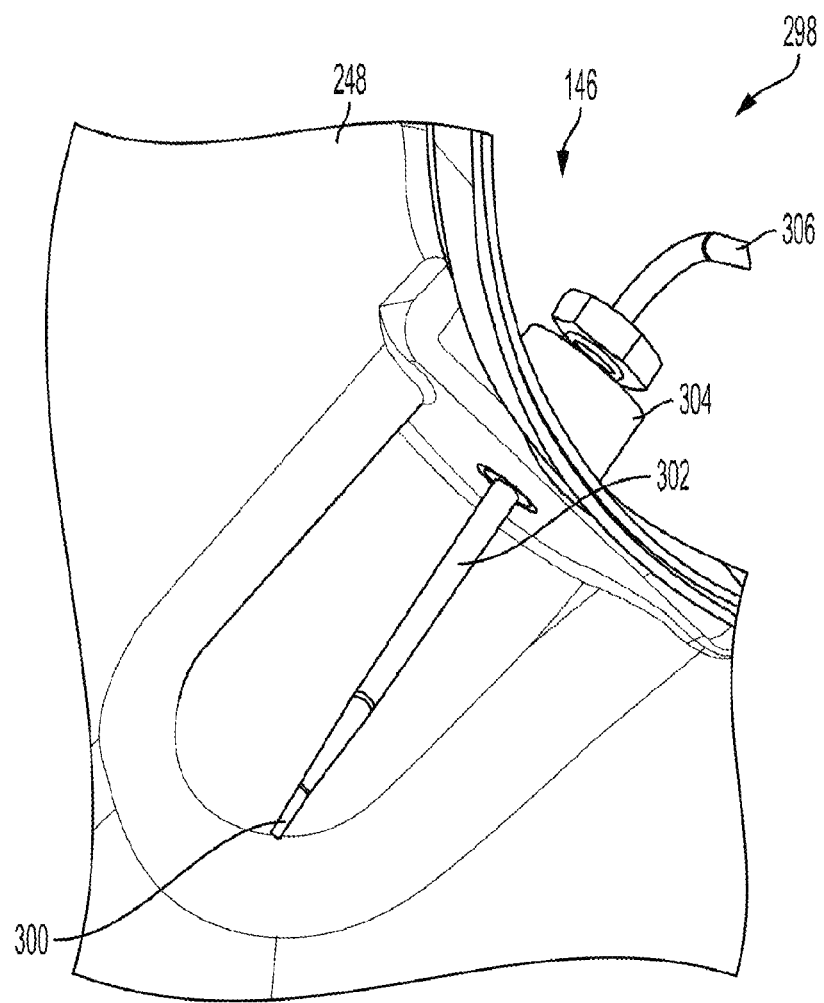
FIG. 11 is a cross-sectional view of the portion of the housing assembly shown in FIG. 10 taken along plane B-B.

In various embodiments, the distributing housing 146 includes one or more sensor assemblies 298 (e.g., temperature sensors, pressure sensors, oxygen sensors, volumetric flow sensors, etc.). FIGS. 10 and 11 illustrate one of the sensor assemblies 298 in greater detail. The sensor assemblies 298 are disposed downstream of the distributing housing inlet flange 246. The sensor assemblies 298 are configured to determine a reading (e.g., temperature, pressure, etc.) of the exhaust gas within the distributing housing 146 (e.g., downstream of the distributing housing inlet flange 246, etc.).

Each of the sensor assemblies 298 may include a conduit intake 300 (e.g., channel inlet, pipe opening, etc.). The conduit intake 300 may be fluidly coupled within the distributing housing 146 and be configured to receive a small portion of the exhaust gas. The small portion of the exhaust gas may be utilized to determine the reading of the exhaust gas. Each of the sensor assemblies 298 may also include an internal conduit 302 (e.g., inner channel, interior pipe, etc.). The internal conduit 302 may be disposed within the distributing housing 146. The internal conduit 302 may be fluidly coupled to the conduit intake 300 and may be configured to receive the small portion of the exhaust gas.

Each of the sensor assemblies 298 includes a sensor boss 304 (e.g., protruding member, projection, etc.). The sensor boss 304 includes an aperture for which the conduit intake 300 may extend through. After placing the conduit intake 300 through the aperture of the sensor boss 304, the conduit intake 300 can be placed into its desired position. The conduit intake 300 may then be coupled to the sensor boss 304.

Each of the sensor assemblies 298 may also include an external conduit 306 (e.g., outer channel, exterior pipe, etc.). The external conduit 306 may be coupled to the sensor boss 304 at a first end. The external conduit 306 may be fluidly coupled to the internal conduit 302 so that the external conduit 306 is configured to receive the small portion of the exhaust gas.

Each of the sensor assemblies 298 may also include a conduit seal 308 (e.g., channel plug, pipe gasket, etc.). The conduit seal 308 may be fluidly coupled to the external conduit 306 and may be configured to receive the small portion of the exhaust gas. The conduit seal 308 may be fluidly coupled to a sensor (e.g., temperature sensor, pressure sensor, oxygen sensor, volumetric flow sensor, etc.) and may be configured to provide the small portion of the exhaust gas to the sensor.

Figure 12:
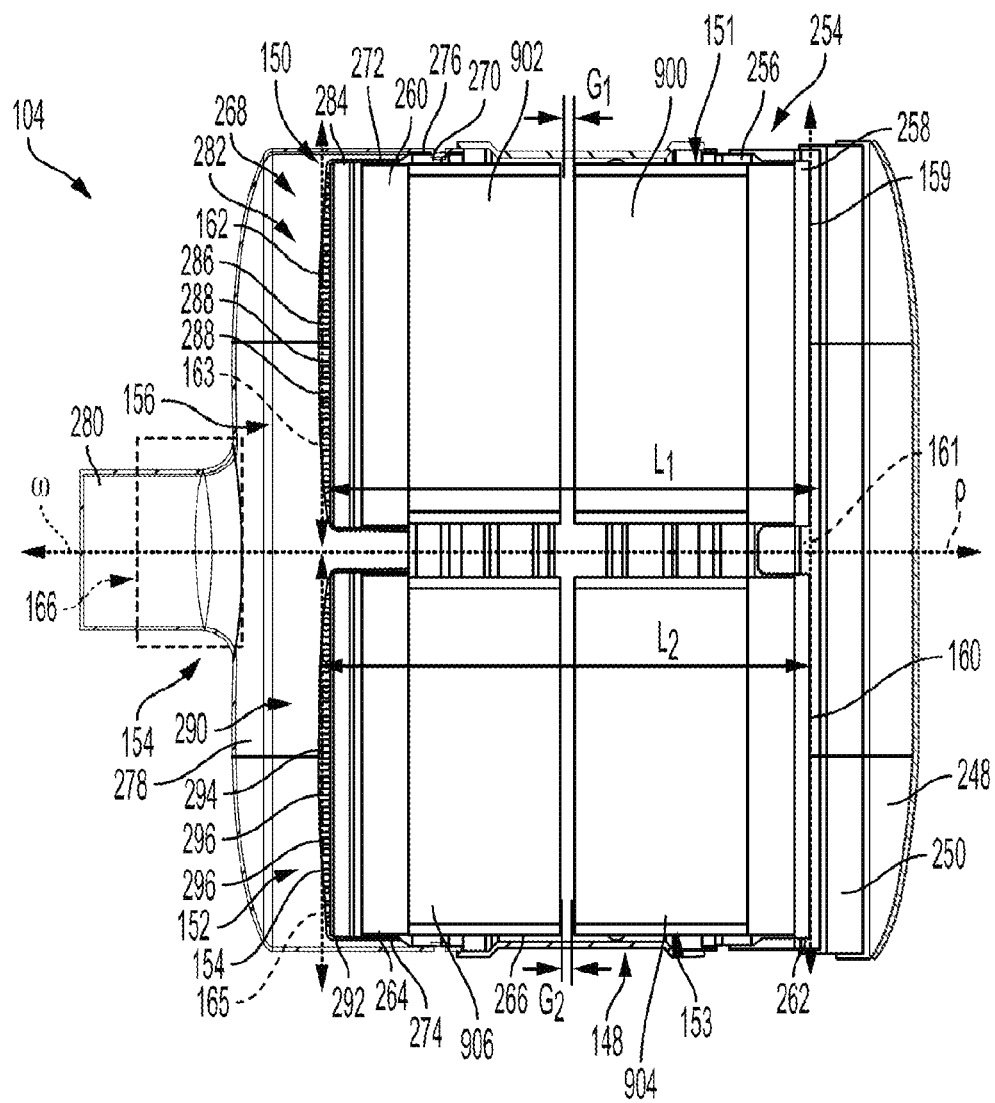
FIG. 12 is a cross-sectional view of yet another example housing assembly.
Figure 13:
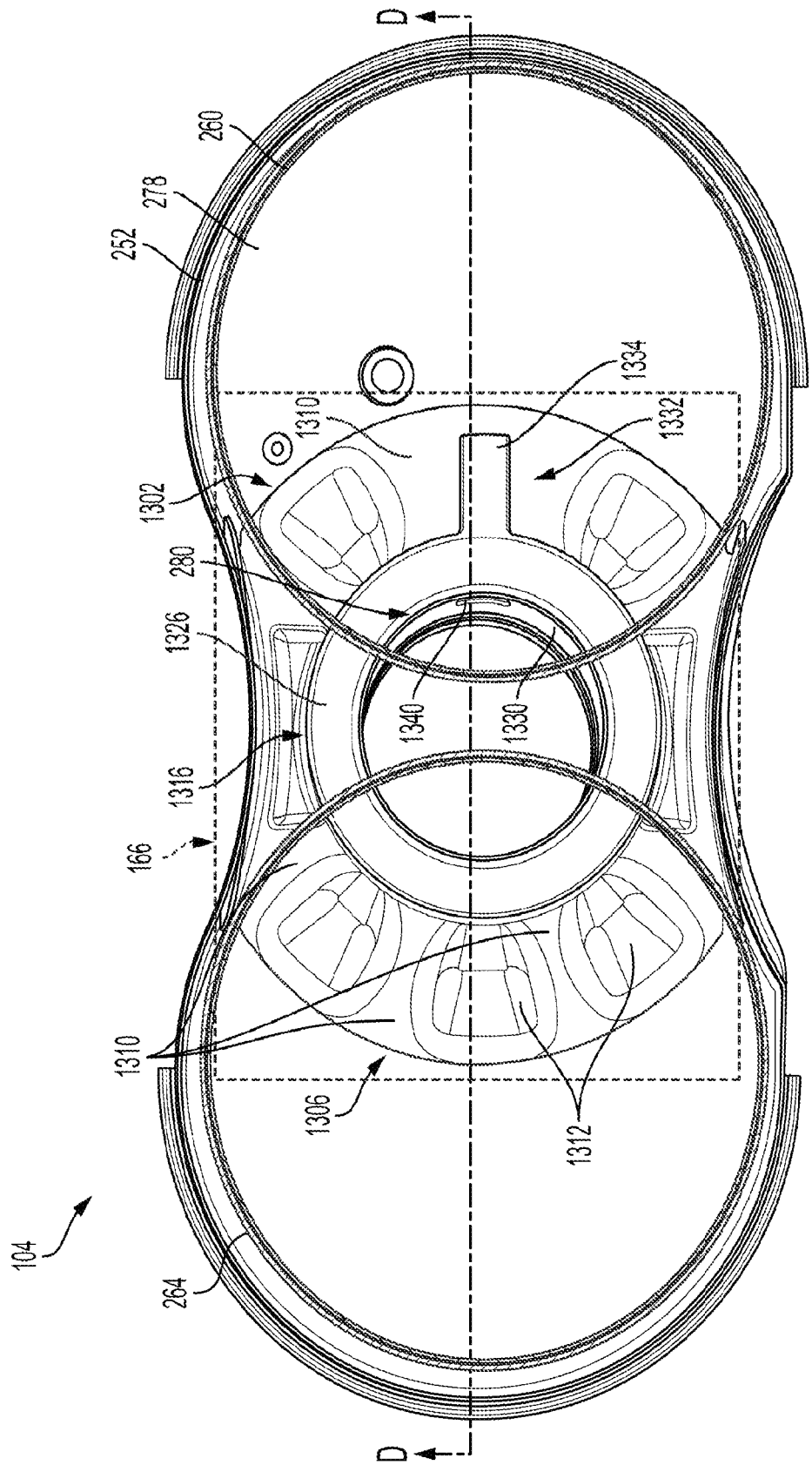
FIG. 13 is a cross-sectional view of the housing assembly and the outlet sampling system shown in FIG. 3 taken along plane C-C in FIG. 7, according to some embodiments.
Figure 14:
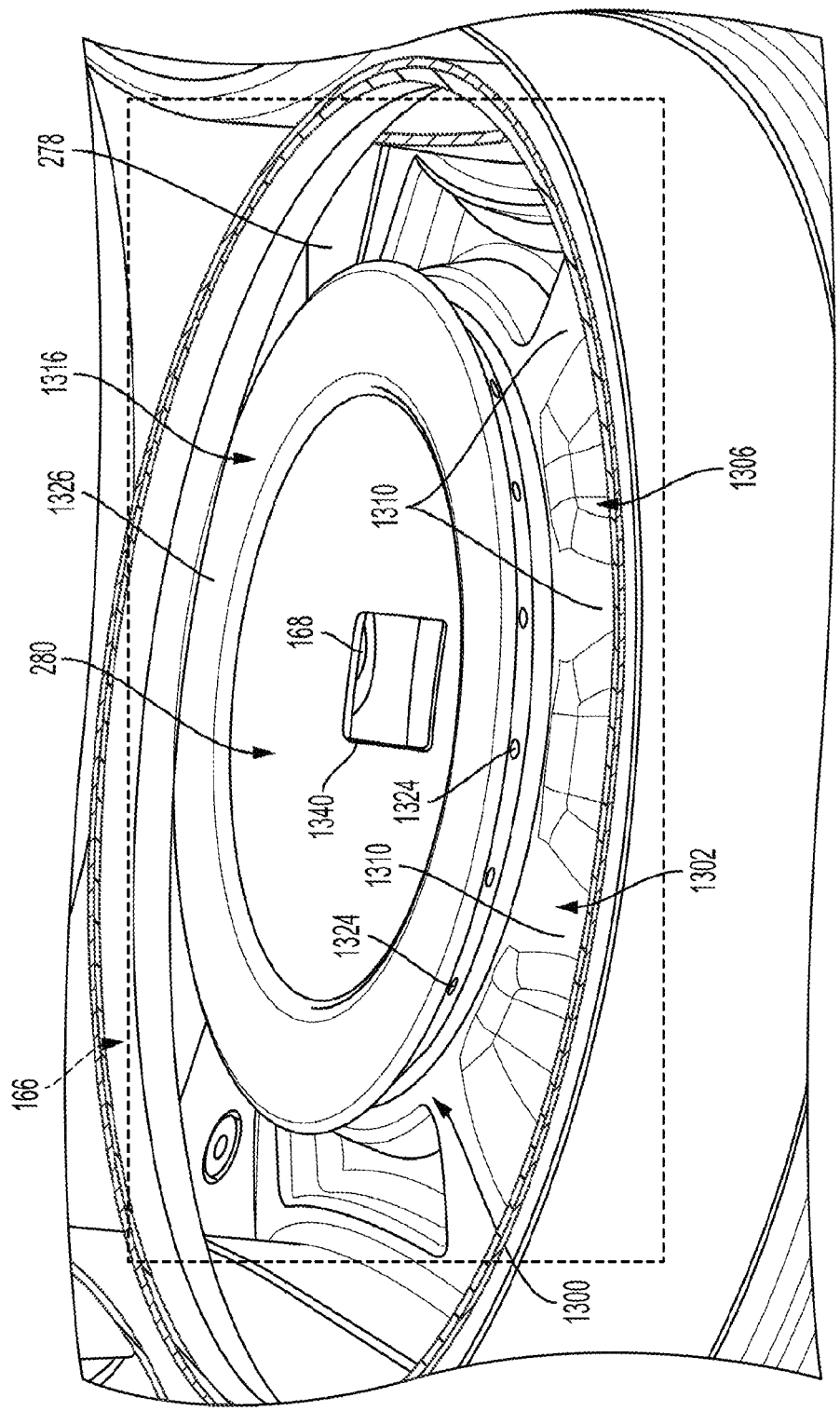
FIG. 14 is a perspective view of the housing assembly and the outlet sampling system shown in FIG. 13.

FIG. 12 illustrates the housing assembly 104 according to various embodiments. The first catalyst material 151 includes a first catalyst material first portion 900 (e.g., catalyst metals, etc.). The first catalyst material first portion 900 may include, for example, platinum, rhodium, palladium, or other similar materials. The first catalyst material first portion 900 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the first catalyst material first portion 900 is a ceramic catalyst material. In some embodiments, the first catalyst material first portion 900 is an extruded catalyst material.

The first catalyst material 151 also includes a first catalyst material second portion 902 (e.g., catalyst metals, etc.). The first catalyst material second portion 902 may include, for example, platinum, rhodium, palladium, or other similar materials. The first catalyst material second portion 902 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the first catalyst material second portion 902 is a ceramic catalyst material. In some embodiments, the first catalyst material second portion 902 is an extruded catalyst material.

In various embodiments, the first catalyst material second portion 902 includes different materials than the first catalyst material first portion 900. For example, the first catalyst material second portion 902 may include platinum and the first catalyst material first portion 900 may include rhodium or palladium. In another example, the first catalyst material second portion 902 may include platinum, rhodium, or palladium and the first catalyst material first portion 900 may include a ceramic material. By including different materials in the first catalyst material first portion 900 and the first catalyst material second portion 902, an ability of the first catalyst material 151 to assist in the reduction of $NO_x$ emissions may be tailored for a target application, and/or the first catalyst member separation length $L_1$ may be decreased.

In various embodiments, the first catalyst material second portion 902 is separated from the first catalyst material first portion 900 by a first gap $G_1$ (e.g., separation, etc.). The first gap $G_1$ may provide a mechanism for the exhaust gas to redistribute after exiting the first catalyst material first portion 900 and prior to entering the first catalyst material second portion 902. By selecting the first gap $G_1$, an ability of the first catalyst material 151 to assist in the reduction of $NO_x$ emissions may be tailored for a target application, and/or the first catalyst member separation length $L_1$ may be decreased.

The second catalyst material 153 includes a second catalyst material first portion 904 (e.g., catalyst metals, etc.). The second catalyst material first portion 904 may include, for example, platinum, rhodium, palladium, or other similar materials. The second catalyst material first portion 904 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the second catalyst material first portion 904 is a ceramic catalyst material. In some embodiments, the second catalyst material first portion 904 is an extruded catalyst material.

The second catalyst material 153 also includes a second catalyst material second portion 906 (e.g., catalyst metals, etc.). The second catalyst material second portion 906 may include, for example, platinum, rhodium, palladium, or other similar materials. The second catalyst material second portion 906 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the second catalyst material second portion 906 is a ceramic catalyst material. In some embodiments, the second catalyst material second portion 906 is an extruded catalyst material.

In various embodiments, the second catalyst material second portion 906 includes different materials than the second catalyst material first portion 904. For example, the second catalyst material second portion 906 may include platinum and the second catalyst material first portion 904 may include rhodium or palladium. In another example, the second catalyst material second portion 906 may include platinum, rhodium, or palladium and the second catalyst material first portion 904 may include a ceramic material. By including different materials in the second catalyst material first portion 904 and the second catalyst material second portion 906, an ability of the second catalyst material 153 to assist in the reduction of $NO_x$ emissions may be tailored for a target application, and/or the second catalyst member separation length $L_2$ may be decreased.

In various embodiments, the second catalyst material second portion 906 is separated from the second catalyst material first portion 904 by a second gap $G_2$ (e.g., separation, etc.). The second gap $G_2$ may provide a mechanism for the exhaust gas to redistribute after exiting the second catalyst material first portion 904 and prior to entering the second catalyst material second portion 906. By selecting the second gap $G_2$, an ability of the second catalyst material 153 to assist in the reduction of $NO_x$ emissions may be tailored for a target application, and/or the second catalyst member separation length $L_2$ may be decreased.

In some embodiments, the first catalyst material 151 does not include the first catalyst material first portion 900 and the first catalyst material second portion 902, and the second catalyst material 153 includes the second catalyst material first portion 904 and the second catalyst material second portion 906. In some embodiments, the first catalyst material 151 includes the first catalyst material first portion 900 and the first catalyst material second portion 902 and the second catalyst material 153 does not include the second catalyst material first portion 904 or the second catalyst material second portion 906.

Figure 4:
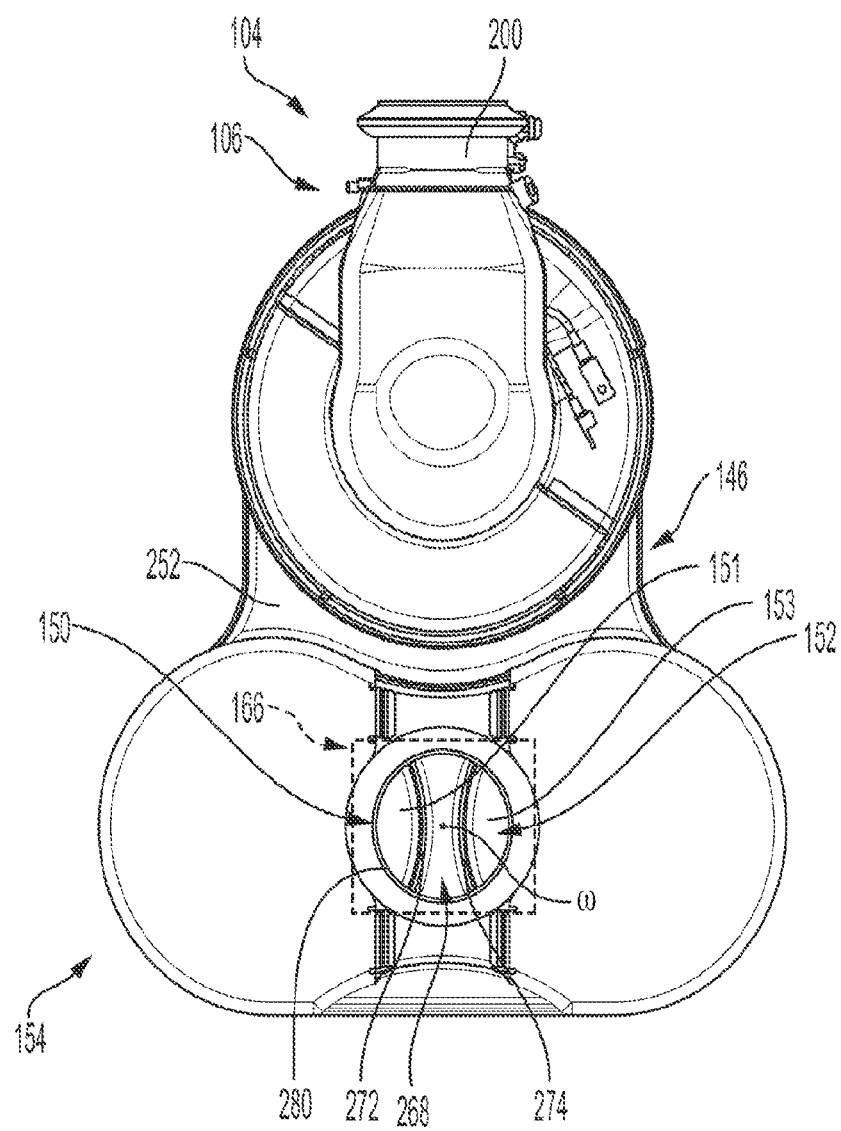
FIG. 4 is a front view of the housing assembly shown in FIG. 3.
Figure 5:
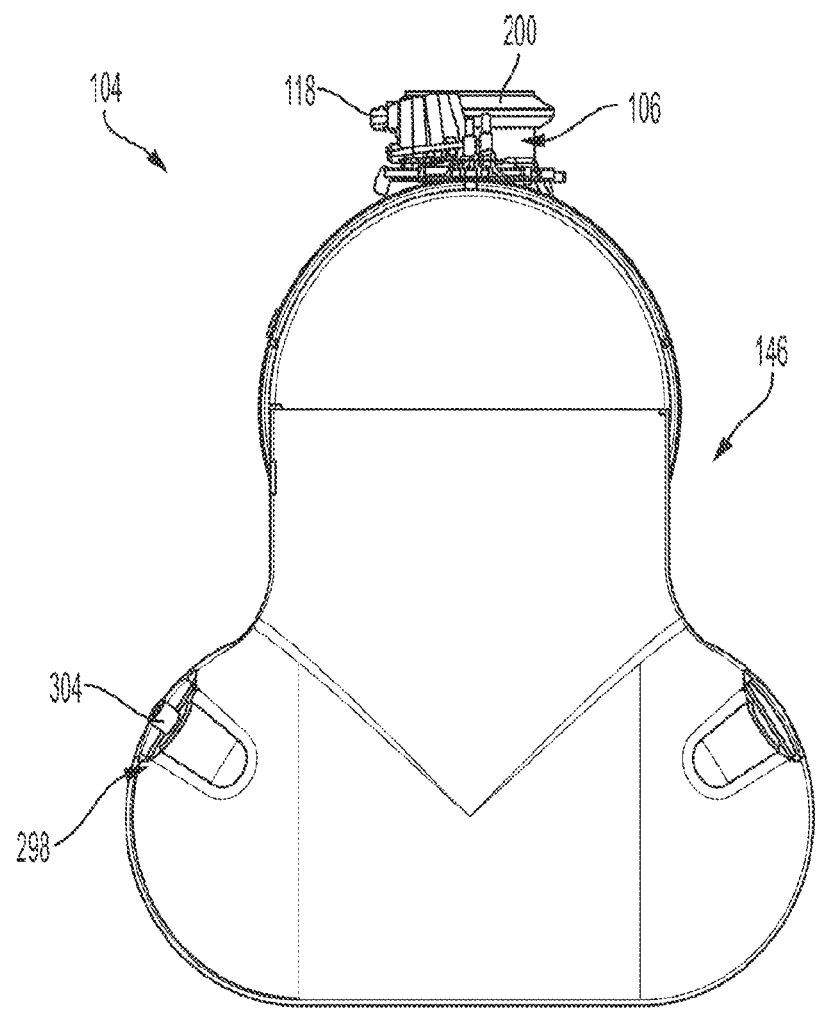
FIG. 5 is a rear view of the housing assembly shown in FIG. 3.
Figure 6:
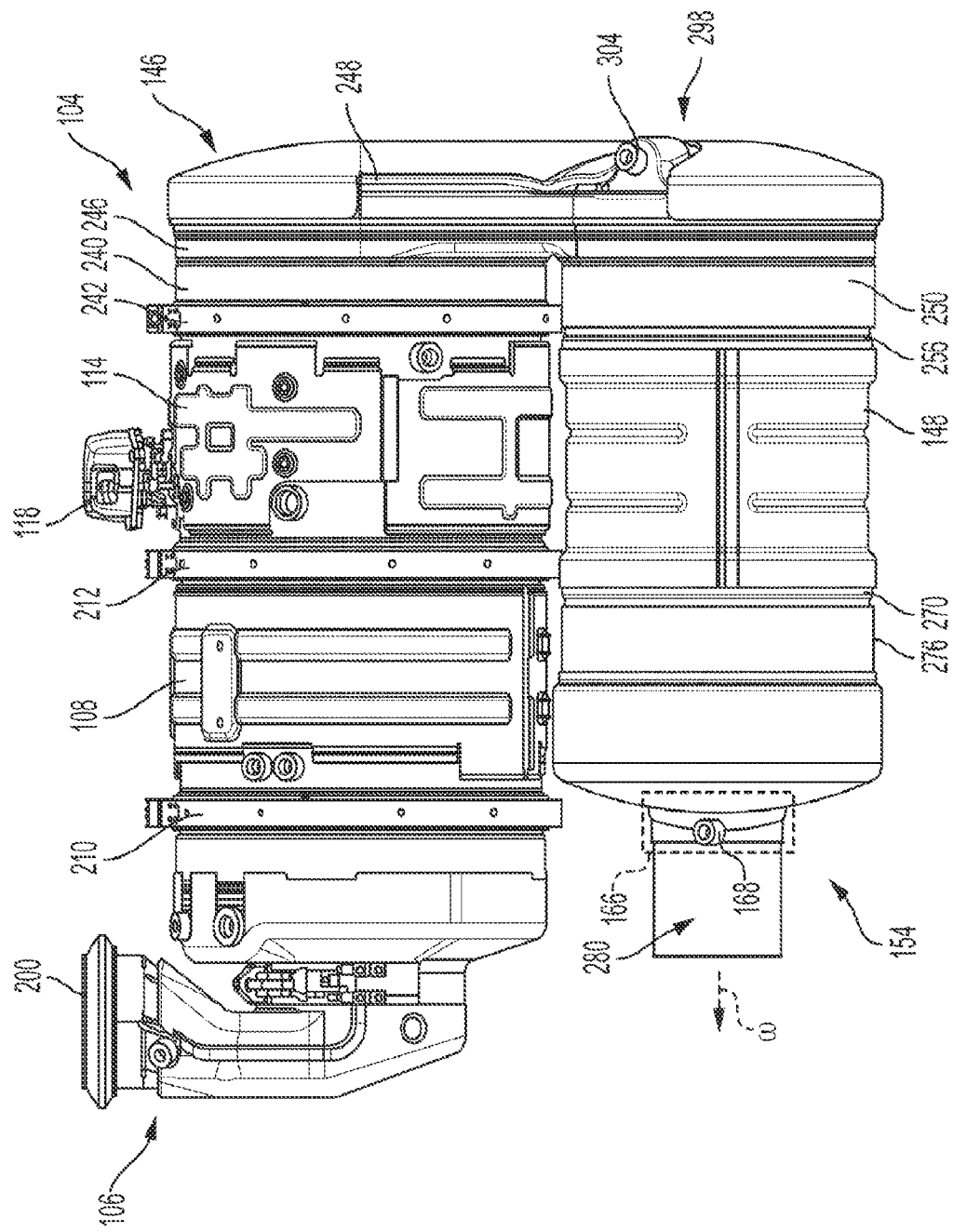
FIG. 6 is a side view of the housing assembly shown in FIG. 3.
Figure 7:
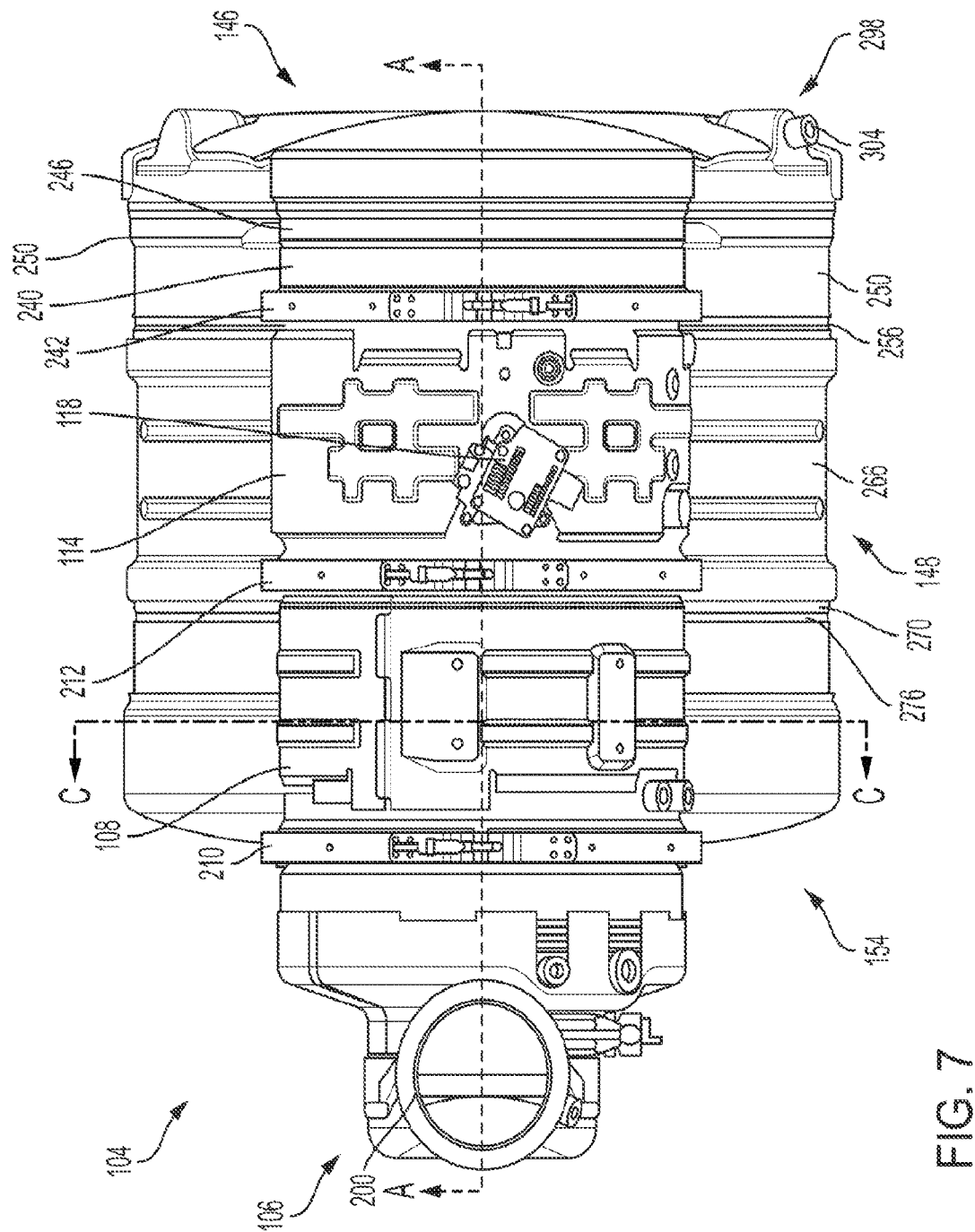
FIG. 7 is a top view of the housing assembly shown in FIG. 3.
Figure 8:
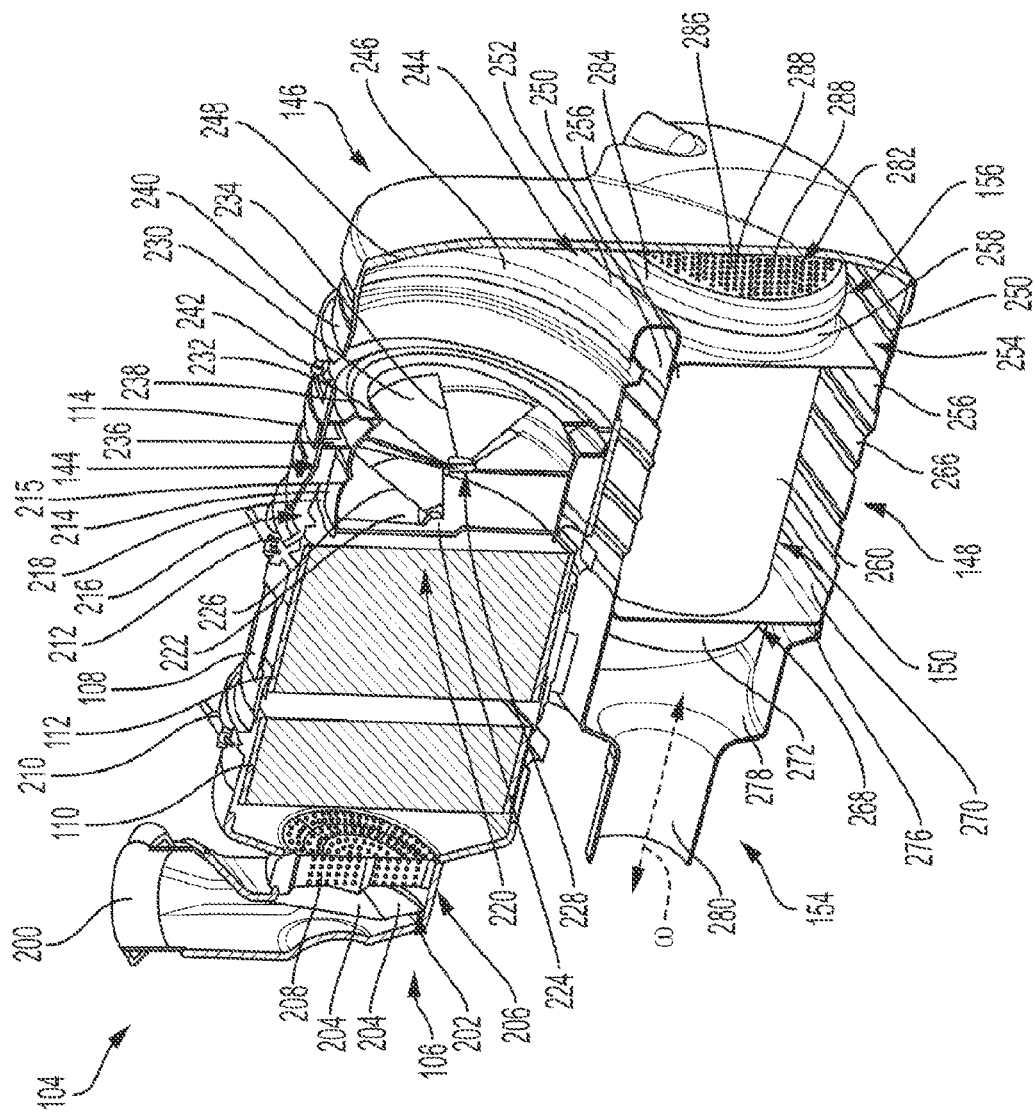
FIG. 8 is a cross-sectional view of the housing assembly shown in FIG. 3 taken along plane A-A in FIG. 7.

As discussed in more detail herein, the flow divider 156 can be deployed in various configurations. In FIGS. 4, 8, and 9, the flow divider 156 is arranged such that the first endcap flange 284 of the first endcap 282 is coupled to or integrally formed with the first support first catalyst member flange 258 of the first support 254 and the second endcap flange 292 of the second endcap 290 is coupled to or integrally formed with the first support second catalyst member flange 262 of the first support 254. In FIG. 12, the flow divider 156 is arranged such that the first endcap flange 284 of the first endcap 282 is coupled to or integrally formed with the second support first catalyst member flange 272 of the second support 268 and the second endcap flange 292 of the second endcap 290 is coupled to or integrally formed with the second support second catalyst member flange 274 of the second support 268.

IV. First Example Outlet Sampling System

Figure 15:
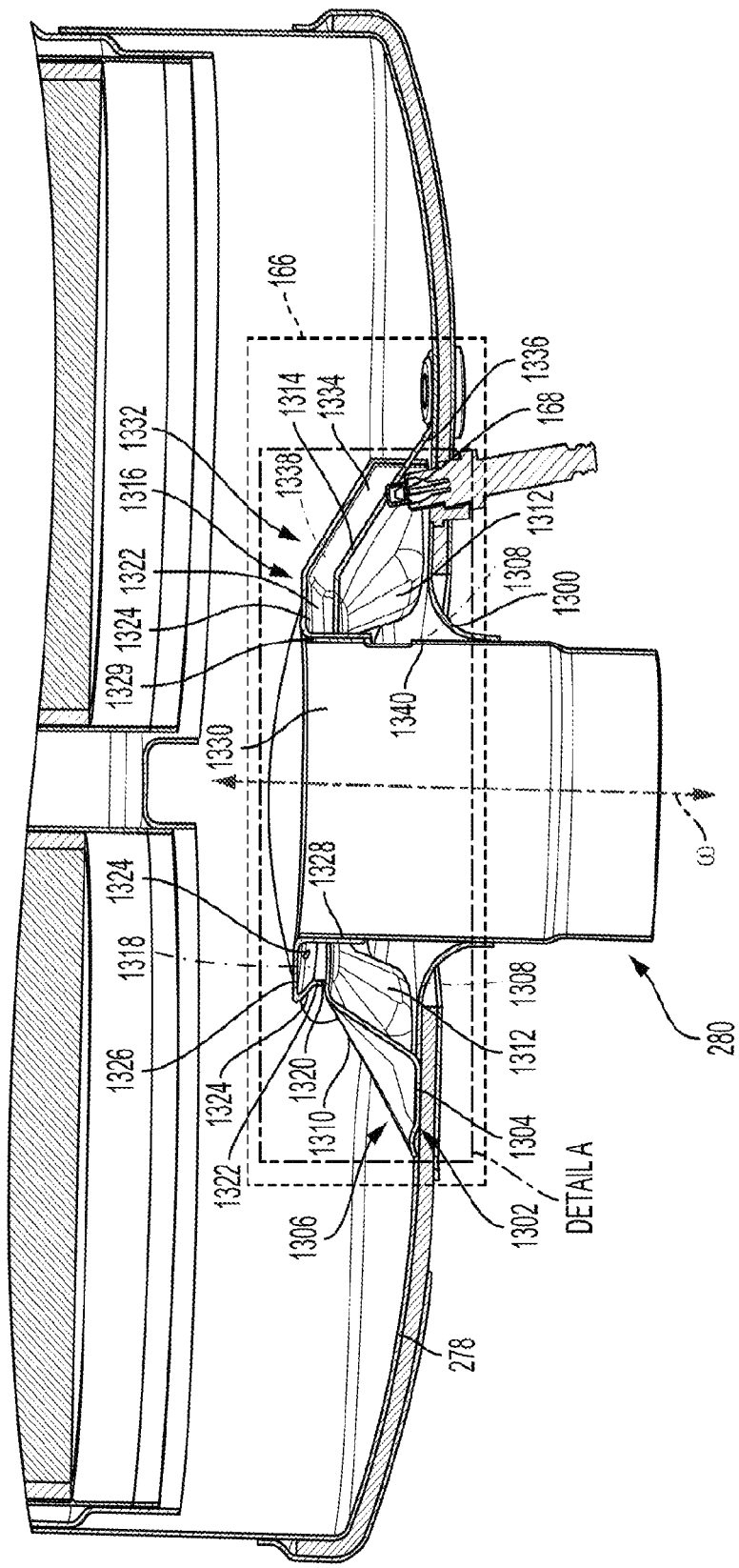
FIG. 15 is a cross-sectional view of the housing assembly and the outlet sampling system shown in FIG. 13 taken along plane D-D.
Figure 16:
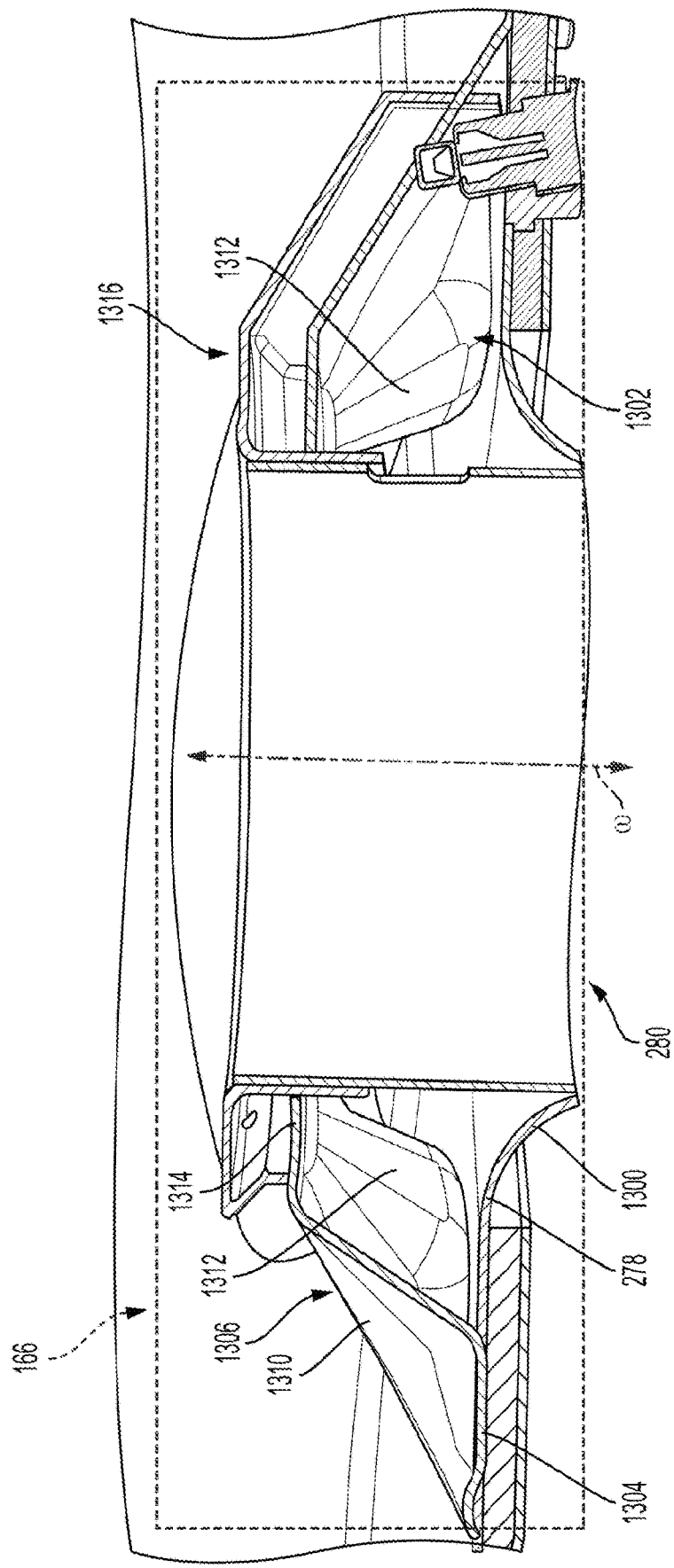
FIG. 16 is a view of Detail A in FIG. 15.
Figure 17:
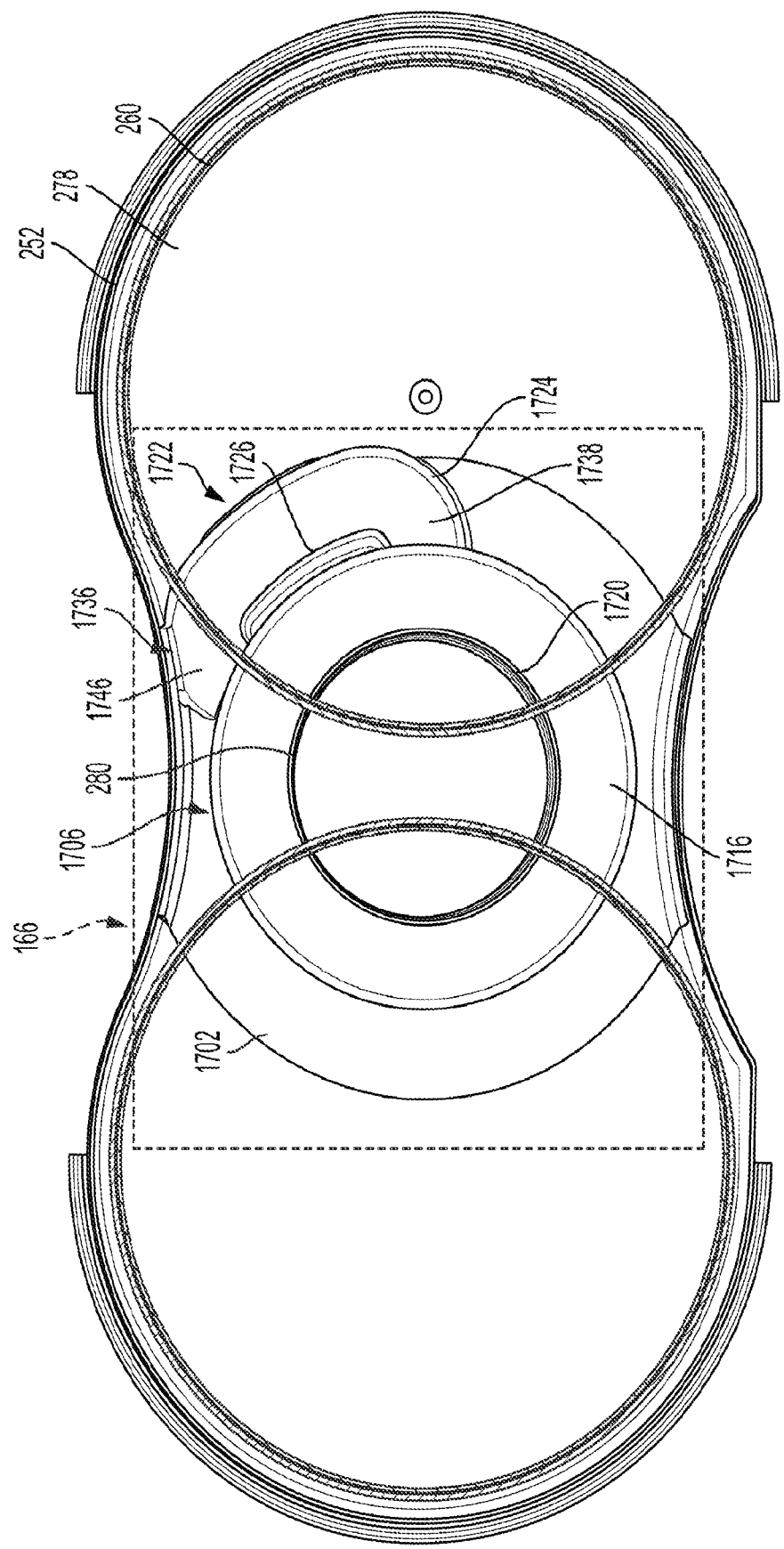
FIG. 17 is a cross-sectional view of the housing assembly and the outlet sampling system shown in FIG. 3 taken along plane C-C in FIG. 7, according to some embodiments.
Figure 18:
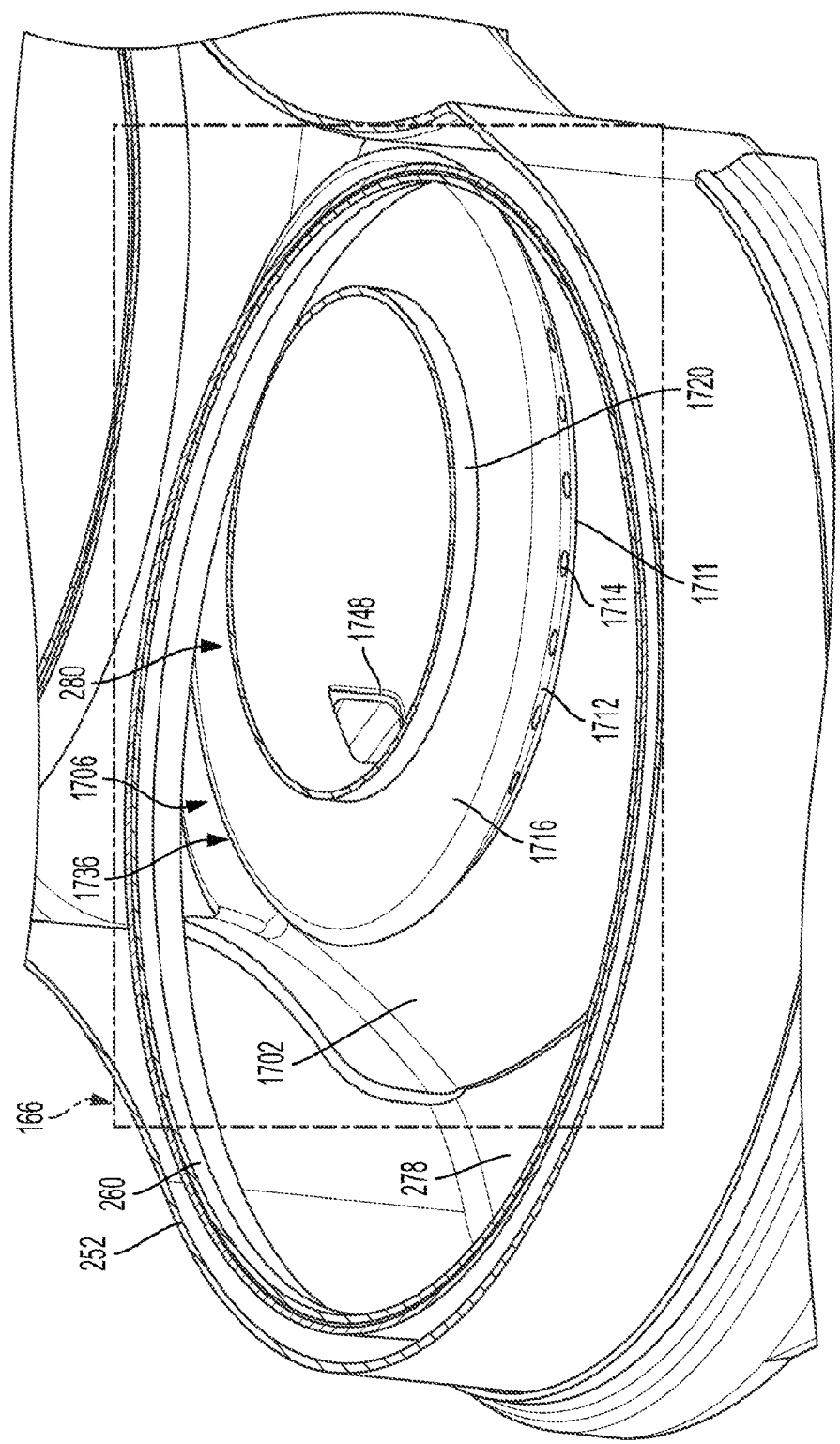
FIG. 18 is a perspective view of the housing assembly and the outlet sampling system shown in FIG. 17.

FIGS. 13-16 illustrate the outlet sampling system 166 according to various embodiments. As discussed above, the outlet sampling system 166 includes the outlet housing fitting 280. The exhaust gas aftertreatment system 100 also includes a flanged coupler 1300 (e.g., joint, etc.), as shown in FIGS. 15 and 16. The flanged coupler 1300 is coupled to the outlet housing body 278 and is configured to receive the outlet housing fitting 280 such that the outlet housing fitting 280 may be coupled to the flanged coupler 1300. In some embodiments, a band clamp (e.g., Marmon clamp, etc.) is placed around the flanged coupler 1300, the outlet housing fitting 280 is inserted within the flanged coupler 1300, and the flanged coupler 1300 is tightened onto the outlet housing fitting 280. In some applications, the flanged coupler 1300 is welded to the outlet housing fitting 280.

The outlet sampling system 166 also includes a sampling bowl 1302 (e.g., sampling cover, etc.). The sampling bowl 1302 includes a housing flange 1304 (e.g., lip, etc.). The housing flange 1304 is coupled to the outlet housing body 278. In various embodiments, the housing flange 1304 is coupled to the outlet housing body 278 around the flanged coupler 1300.

The sampling bowl 1302 also includes a sampling bowl wall 1306 (e.g., panel, etc.). The sampling bowl wall 1306 cooperates with the outlet housing body 278 to define a sampling bowl cavity 1308 (e.g., void, etc.). The outlet sensor 168 is coupled to the outlet housing body 278 such that the outlet sensor 168 is exposed to the exhaust gas within the sampling bowl cavity 1308 which is sampled by the outlet sampling system 166. The sampling bowl wall 1306 separates the exhaust gas within the sampling bowl cavity 1308 from the exhaust gas outside of the sampling bowl cavity 1308.

The sampling bowl wall 1306 includes a plurality of supports 1310 (e.g., arms, braces, projections, etc.). Each of the supports 1310 is contiguous with the sampling bowl 1302 and projects away from the housing flange 1304. The sampling bowl wall 1306 also includes a plurality of projections 1312 (e.g., ribs, etc.). Each of the projections 1312 projects into the sampling bowl cavity 1308. As a result, the exhaust gas flowing within the sampling bowl cavity 1308 is caused to flow around the projections 1312. The projections 1312 may assist in mitigating swirling of the exhaust gas within the sampling bowl cavity 1308, which may increase accuracy of the determinations facilitated by the outlet sensor 168.

The sampling bowl 1302 also includes a sampling bowl support flange 1314 (e.g., brace, etc.). The sampling bowl support flange 1314 is contiguous with the sampling bowl wall 1306 and is separated from the outlet housing body 278 by the sampling bowl wall 1306. In some embodiments, the sampling bowl support flange 1314 is disposed along a first plane and the housing flange 1304 is disposed along a second plane that is parallel to the first plane.

The outlet sampling system 166 also includes a sampling ring 1316 (e.g., guide, etc.). The sampling ring 1316 cooperates with the sampling bowl 1302 to define a sampling ring cavity 1318 (e.g., void, etc.). As is explained in more detail herein, the sampling ring cavity 1318 is configured to receive the exhaust gas from within the outlet housing body 278 and facilitate sampling of the exhaust gas by the outlet sensor 168 by providing the exhaust gas to the sampling bowl cavity 1308.

The sampling ring 1316 includes a sampling ring support flange 1320 (e.g., brace, etc.). The sampling ring support flange 1320 is coupled to the sampling bowl support flange 1314. The sampling ring support flange 1320 is supported by the sampling bowl wall 1306 above the outlet housing body 278.

The sampling ring 1316 also includes a sampling ring inlet flange 1322 (e.g., wall, etc.). The sampling ring inlet flange 1322 is contiguous with the sampling ring support flange 1320. The sampling ring inlet flange 1322 extends from the sampling ring support flange 1320 away from the sampling bowl support flange 1314. In some embodiments, the sampling ring inlet flange 1322 is separated from the sampling ring support flange 1320 by an obtuse angle. For example, the sampling ring inlet flange 1322 may be separated from the sampling ring support flange 1320 by an angle that is approximately in a range of 120 degrees (°) to 170°, inclusive.

The sampling ring 1316 also includes a plurality of sampling ring inlet apertures 1324 (e.g., holes, windows, etc.). Each of the sampling ring inlet apertures 1324 is disposed on the sampling ring inlet flange 1322 and is configured to facilitate provision of the exhaust gas through the sampling ring inlet flange 1322 and into the sampling ring cavity 1318. The sampling ring inlet apertures 1324 are disposed around (e.g., circumferentially around, etc.) the outlet housing fitting axis w. For example, the sampling ring inlet apertures 1324 may be disposed in an angular range approximately equal to 360° around the outlet housing fitting axis ω. In some embodiments, the sampling ring inlet apertures 1324 are disposed around only a portion of the sampling ring inlet flange 1322. For example, the sampling ring inlet apertures 1324 may be disposed in an angular range approximately in a range of 180° to 270° around the outlet housing fitting axis ω.

The sampling ring 1316 may include various numbers of the sampling ring inlet apertures 1324. For example, the sampling ring 1316 may include a number of sampling ring inlet apertures 1324 in approximately in a range of 10 to 30, inclusive. The sampling ring 1316 may also include 10 or fewer sampling ring inlet apertures 1324. The sampling ring inlet apertures 1324 may be disposed in rows arranged along the sampling ring inlet flange 1322. For example, the sampling ring inlet apertures 1324 may be arranged in two or more staggered rows.

By selecting a diameter of each of the sampling ring inlet apertures 1324, a flow of the exhaust gas to the outlet sensor 168 may be controlled. For example, by decreasing the diameters of each of the sampling ring inlet apertures 1324, less of the exhaust gas may be provided to the outlet sensor 168, which may be desirable (e.g., to facilitate desirable operation of the outlet sensor 168, etc.). In various embodiments, the diameters of all of the sampling ring inlet apertures 1324 are the same. For example, the sampling ring inlet apertures 1324 may all have a diameter of 0.50 inches. In other embodiments, each of the sampling ring inlet apertures 1324 have a diameter approximately in a range of 0.0787 inches (e.g., 2 millimeters, etc.) to 0.591 inches (e.g., 15 millimeters, etc.), inclusive.

The sampling ring inlet apertures 1324 may be circular, square, rectangular, hexagonal, pentagonal, triangular, or otherwise similarly shaped. Furthermore, the sampling ring inlet apertures 1324 may all have the same shape (e.g., all of the sampling ring inlet apertures 1324 are circular, etc.) or may be differently shaped (e.g., some of the sampling ring inlet apertures 1324 are circular and others of the sampling ring inlet apertures 1324 are rectangular, etc.). In some embodiments, the sampling ring inlet apertures 1324 are formed as louvers (e.g., portions of the sampling ring 1316 extends across a portion of each of the sampling ring inlet apertures 1324, etc.).

The sampling ring 1316 also includes a blocking flange 1326 (e.g., wall, etc.). The blocking flange 1326 is contiguous with the sampling ring inlet flange 1322 and extends over an entirety of the sampling ring inlet flange 1322.

The sampling ring 1316 also includes a sampling ring insert flange 1328 (e.g., annular flange, etc.). The sampling ring insert flange 1328 is contiguous with the blocking flange 1326. In various embodiments, the sampling ring insert flange 1328 extends from the blocking flange 1326 in a direction that is parallel to a direction along which the sampling ring support flange 1320 extends.

The sampling bowl support flange 1314 defines a support flange aperture 1329 (e.g., hole, opening, etc.). The sampling ring insert flange 1328 is received within the support flange aperture 1329. The sampling ring insert flange 1328 may be coupled to the sampling bowl support flange 1314 around at least a portion of the support flange aperture 1329. For example, the sampling ring insert flange 1328 may be welded to the sampling bowl support flange 1314 around an entirety of the support flange aperture 1329. In another example, the sampling ring insert flange 1328 is press-fit (e.g., friction fit, etc.) within the support flange aperture 1329.

Similarly, the sampling ring insert flange 1328 defines a sampling ring insert aperture 1330 (e.g., hole, opening, etc.). The outlet housing fitting 280 is received within the sampling ring insert aperture 1330. The outlet housing fitting 280 may be coupled to the sampling ring insert flange 1328 around at least a portion of the sampling ring insert aperture 1330. For example, the outlet housing fitting 280 may be welded to the sampling ring insert flange 1328 around an entirety of the sampling ring insert aperture 1330. In another example, the outlet housing fitting 280 is press-fit (e.g., friction fit, etc.) within the sampling ring insert aperture 1330.

The sampling ring 1316 also includes a connector 1332 (e.g., runner, etc.). The connector 1332 is configured to provide the exhaust gas from the sampling ring cavity 1318 to the sampling bowl cavity 1308 where the outlet sensor 168 samples the exhaust gas. The connector 1332 includes a connector wall 1334 (e.g., panel, etc.). The connector wall 1334 is contiguous with the blocking flange 1326 and extends towards the outlet housing body 278. The connector wall 1334 is coupled to one of the supports 1310.

The sampling bowl wall 1306 also includes a connector aperture 1336 (e.g., opening, window, slot, etc.). The connector aperture 1336 is disposed on the support 1310 that the connector wall 1334 is coupled to. The connector aperture 1336 facilitates flow of the exhaust gas through the sampling bowl wall 1306. In various embodiments, such as is shown in FIG. 15, the connector aperture 1336 is aligned with the outlet sensor 168.

The connector wall 1334 defines a connector cavity 1338 (e.g., void, etc.). The connector cavity 1338 is contiguous with the sampling ring cavity 1318 and the sampling bowl cavity 1308. The exhaust gas first flows into the sampling ring cavity 1318 (e.g., via one of the sampling ring inlet apertures 1324), then flows into the connector cavity 1338, and then into the sampling bowl cavity 1308 (e.g., via the connector aperture 1336).

After flowing into the sampling bowl cavity 1308, the exhaust gas may be sampled by the outlet sensor 168. The outlet housing fitting 280 includes a fitting aperture 1340 (e.g., opening, window, slot, etc.). The fitting aperture 1340 facilitates flow of the exhaust gas from the sampling bowl cavity 1308 into the outlet housing fitting 280. In various embodiments, the fitting aperture 1340, the connector aperture 1336, and the outlet sensor 168 are aligned. As a result, exhaust gas may flow straight from the connector aperture 1336 across the outlet sensor 168 and to the fitting aperture 1340.

In some applications, flow of the exhaust gas (e.g., that did not flow through the sampling ring inlet apertures 1324) through the outlet housing fitting 280 may create a vacuum at the fitting aperture 1340 which may draw the exhaust gas from the sampling bowl cavity 1308 and into the outlet housing fitting 280. In this way, the exhaust gas may be sampled by the outlet sensor 168 while minimizing exposure of the outlet sensor 168 to the exhaust gas, and therefore maintaining desirable operation of the outlet sensor 168 for a prolonged period of time. As a result, the outlet sampling system 166 is more desirable than other systems.

In some embodiments, the sampling bowl 1302 and/or the sampling ring 1316 is made from a metal forming process, such as a stamping process. This may enable the sampling bowl 1302 and/or the sampling ring 1316 to be produced more economically, and therefore more desirably, than other components which require use of more complex or costly manufacturing processes.

V. Second Example Outlet Sampling System

Figure 19:
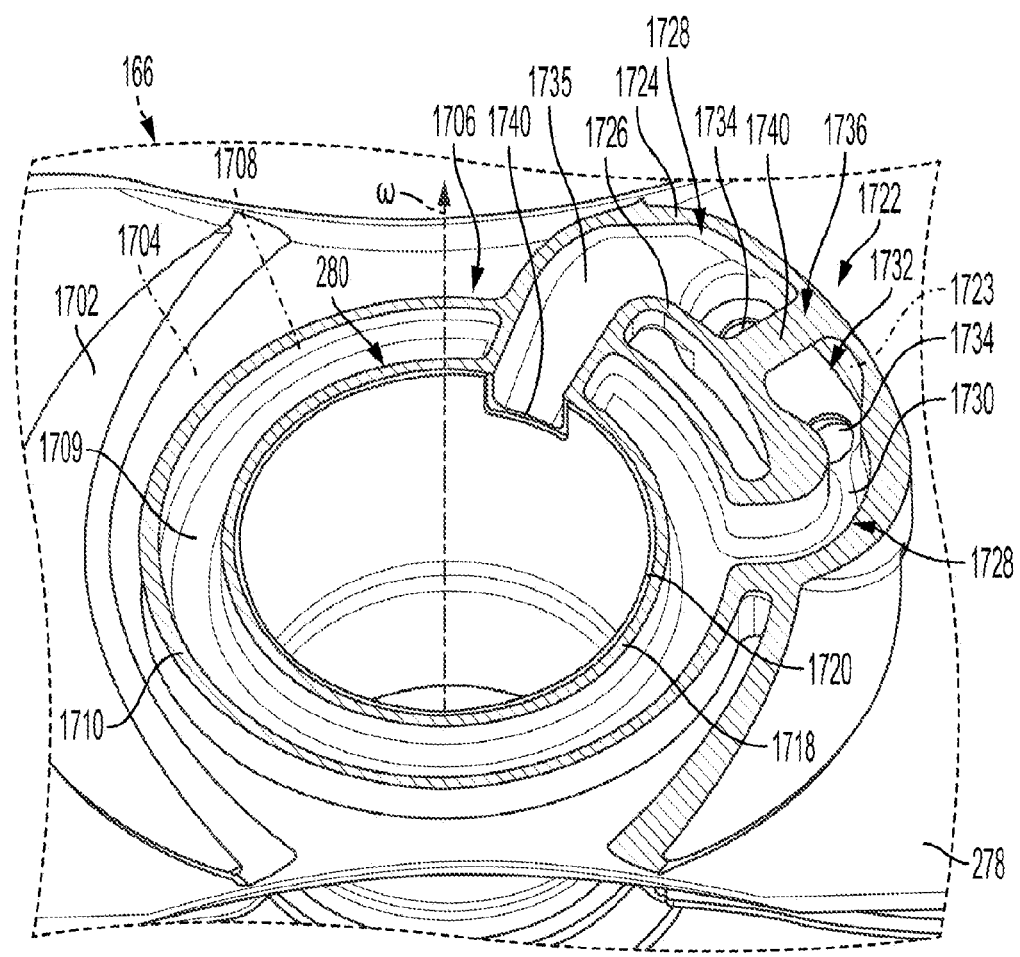
FIG. 19 is a cross-sectional view of the housing assembly and the outlet sampling system shown in FIG. 17.
Figure 20:
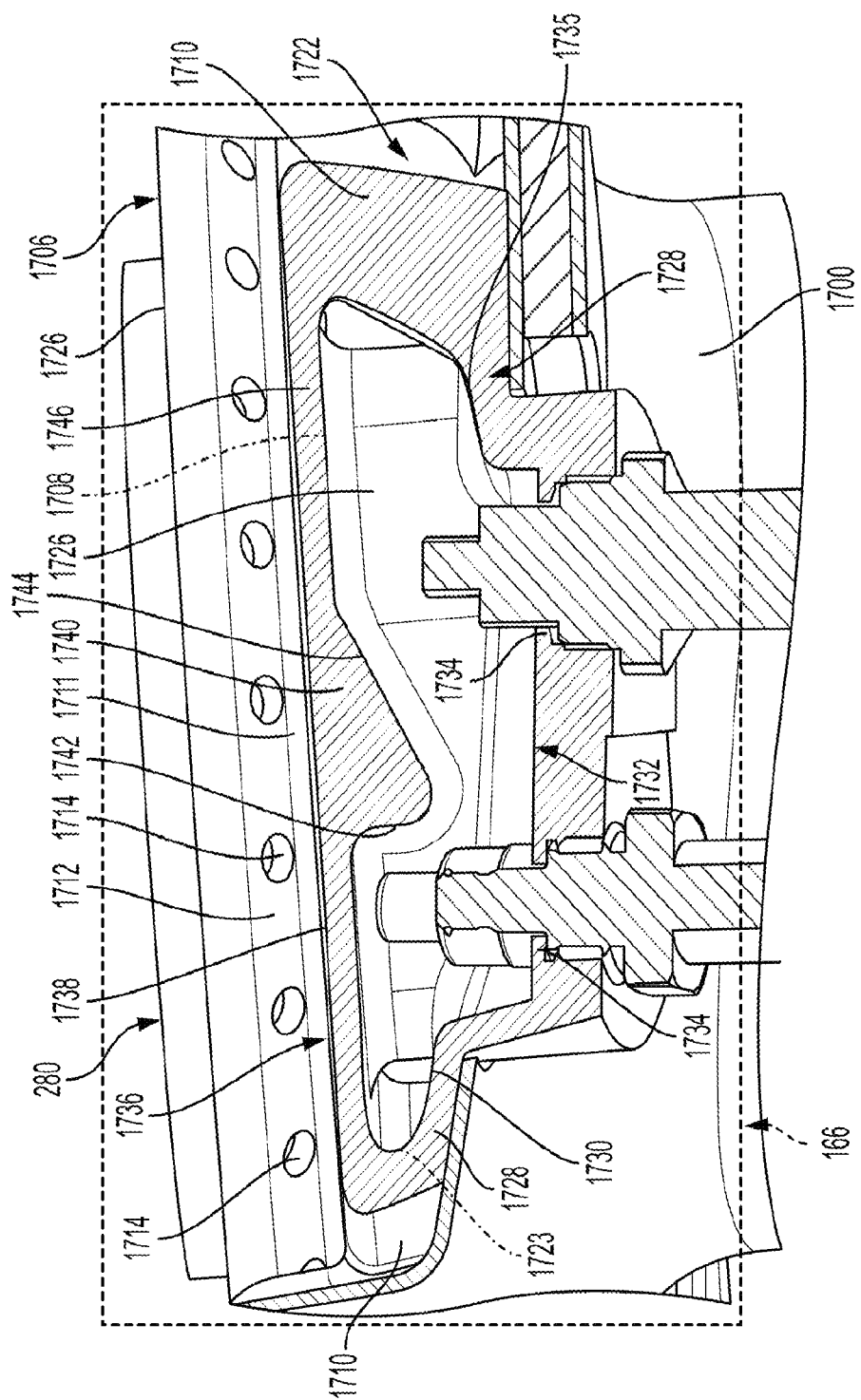
FIG. 20 is another cross-sectional view of the housing assembly and the outlet sampling system shown in FIG. 17.
Figure 21:
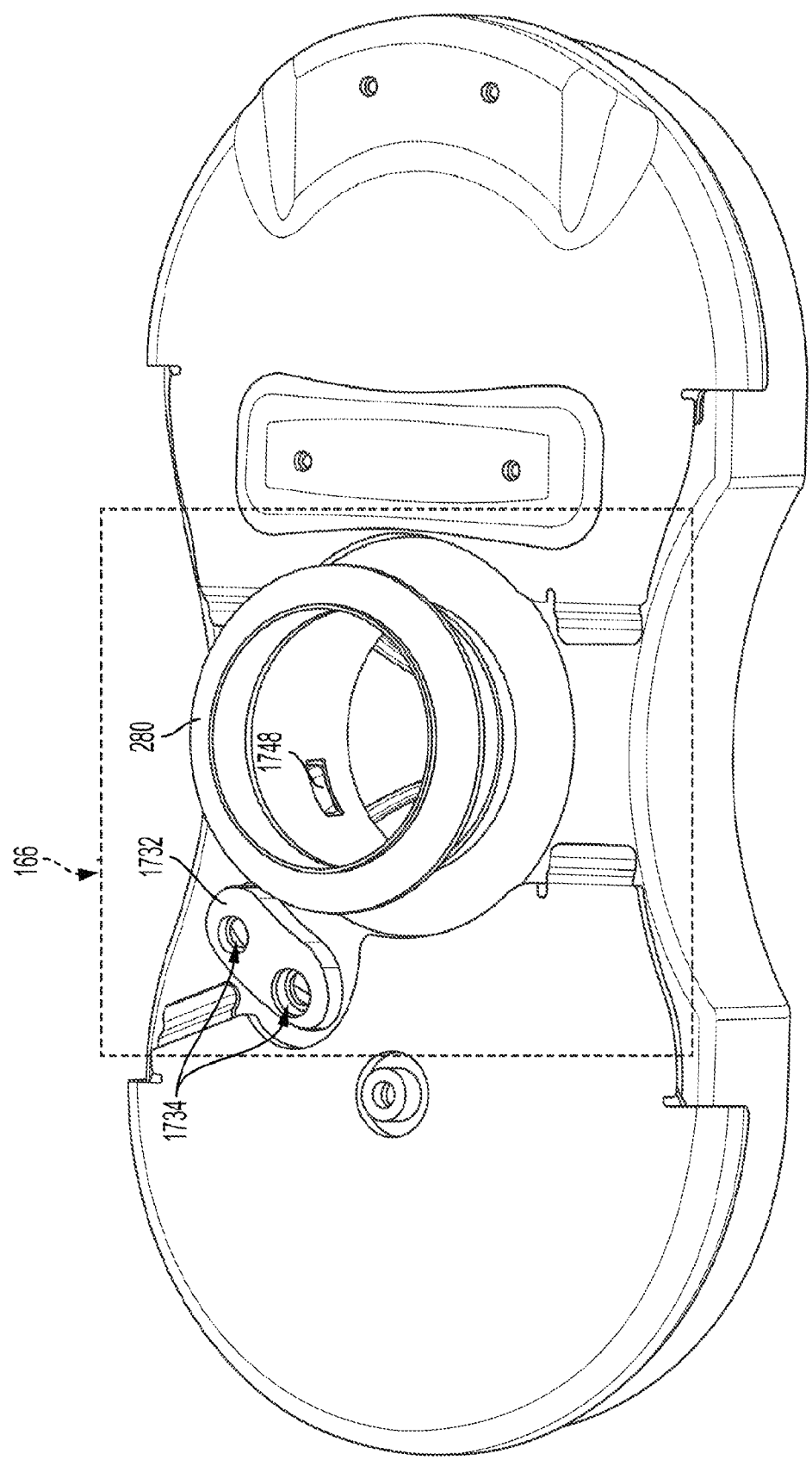
FIG. 21 is a rear view of the housing assembly and the outlet sampling system shown in FIG. 17.

FIGS. 17-21 illustrate the outlet sampling system 166 according to various embodiments. As discussed above, the outlet sampling system 166 includes the outlet housing fitting 280. The exhaust gas aftertreatment system 100 also includes a flanged coupler 1700 (e.g., joint, etc.), as shown in FIGS. 20 and 21. The flanged coupler 1700 is coupled to the outlet housing body 278 and is configured to receive the outlet housing fitting 280 such that the outlet housing fitting 280 may be coupled to the flanged coupler 1700. In some embodiments, a band clamp is placed around the flanged coupler 1700, the outlet housing fitting 280 is inserted within the flanged coupler 1700, and the flanged coupler 1700 is tightened onto the outlet housing fitting 280. In some applications, the flanged coupler 1700 is welded to the outlet housing fitting 280.

The outlet sampling system 166 also includes a cover 1702. The cover 1702 is coupled to the outlet housing body 278. In various embodiments, the cover 1702 is coupled to the outlet housing body 278 around the flanged coupler 1700. The cover 1702 cooperates with the outlet housing body 278 to define a cover cavity 1704 (e.g., void, etc.). As is explained in more detail herein, the cover cavity 1704 provides space within which additional components of the outlet sampling system 166 may be located and used to sample the exhaust gas.

The outlet sampling system 166 also includes a sampling ring 1706 (e.g., guide, etc.). The sampling ring 1706 is coupled to the cover 1702. The sampling ring 1706 may also be coupled to the outlet housing body 278. A portion of the sampling ring 1706 is positioned within the cover cavity 1704.

The sampling ring 1706 defines a sampling ring cavity 1708 (e.g., void, etc.). As is explained in more detail herein, the sampling ring cavity 1708 is configured to receive the exhaust gas from within the outlet housing body 278 and facilitate sampling of the exhaust gas by the outlet sensor 168 by providing the exhaust gas to the sampling bowl cavity 1308.

The sampling ring 1706 includes a sampling ring floor flange 1709. The sampling ring floor flange 1709 is in confronting relation with the outlet housing body 278. In some embodiments, at least a portion of the sampling ring floor flange 1709 is coupled to the outlet housing body 278. The sampling ring 1706 also includes a sampling ring base flange 1710. The sampling ring base flange 1710 is contiguous with the sampling ring floor flange 1709 and extends away from the outlet housing body 278. In some embodiments, at least a portion of the sampling ring base flange 1710 is coupled to the cover 1702.

The sampling ring 1706 also includes a sampling ring support flange 1711 (e.g., brace, etc.). The sampling ring support flange 1711 is contiguous with the sampling ring base flange 1710. The sampling ring support flange 1711 is coupled to the cover 1702. The sampling ring support flange 1711 is supported by the cover 1702 above the outlet housing body 278.

The sampling ring 1706 also includes a sampling ring inlet flange 1712 (e.g., wall, etc.). The sampling ring inlet flange 1712 is contiguous with the sampling ring support flange 1711. The sampling ring inlet flange 1712 extends from the sampling ring support flange 1711 away from the cover 1702. In some embodiments, the sampling ring inlet flange 1712 is separated from the sampling ring support flange 1711 by an obtuse angle. For example, the sampling ring inlet flange 1712 may be separated from the sampling ring support flange 1711 by an angle that is approximately in a range of 120° to 170°, inclusive.

The sampling ring 1706 also includes a plurality of sampling ring inlet apertures 1714 (e.g., holes, windows, etc.). Each of the sampling ring inlet apertures 1714 is disposed on the sampling ring inlet flange 1712 and is configured to facilitate provision of the exhaust gas through the sampling ring inlet flange 1712 and into the sampling ring cavity 1708. The sampling ring inlet apertures 1714 are disposed around (e.g., circumferentially around, etc.) the outlet housing fitting axis ω. For example, the sampling ring inlet apertures 1714 may be disposed in an angular range approximately equal to 360° around the outlet housing fitting axis ω. In some embodiments, the sampling ring inlet apertures 1714 are disposed around only a portion of the sampling ring inlet flange 1712. For example, the sampling ring inlet apertures 1714 may be disposed in an angular range approximately in a range of 180° to 270° around the outlet housing fitting axis ω.

The sampling ring 1706 may include various numbers of the sampling ring inlet apertures 1714. For example, the sampling ring 1706 may include a number of sampling ring inlet apertures 1714 in approximately in a range of 10 to 30, inclusive. The sampling ring 1706 may also include 10 or fewer sampling ring inlet apertures 1714. The sampling ring inlet apertures 1714 may be disposed in rows arranged along the sampling ring inlet flange 1712. For example, the sampling ring inlet apertures 1714 may be arranged in two or more staggered rows.

By selecting a diameter of each of the sampling ring inlet apertures 1714, a flow of the exhaust gas to the outlet sensor 168 may be controlled. For example, by decreasing the diameters of each of the sampling ring inlet apertures 1714, less of the exhaust gas may be provided to the outlet sensor 168, which may be desirable (e.g., to facilitate desirable operation of the outlet sensor 168, etc.). In various embodiments, the diameters of all of the sampling ring inlet apertures 1714 are the same. For example, the sampling ring inlet apertures 1714 may all have a diameter of 0.50 inches. In other embodiments, each of the sampling ring inlet apertures 1714 have a diameter approximately in a range of 0.0787 inches (e.g., 2 millimeters, etc.) to 0.591 inches (e.g., 15 millimeters, etc.), inclusive.

The sampling ring inlet apertures 1714 may be circular, square, rectangular, hexagonal, pentagonal, triangular, or otherwise similarly shaped. Furthermore, the sampling ring inlet apertures 1714 may all have the same shape (e.g., all of the sampling ring inlet apertures 1714 are circular, etc.) or may be differently shaped (e.g., some of the sampling ring inlet apertures 1714 are circular and others of the sampling ring inlet apertures 1714 are rectangular, etc.). In some embodiments, the sampling ring inlet apertures 1714 are formed as louvers (e.g., portions of the sampling ring 1706 extends across a portion of each of the sampling ring inlet apertures 1714, etc.).

The sampling ring 1706 also includes a sampling ring blocking flange 1716 (e.g., wall, etc.). The sampling ring blocking flange 1716 is contiguous with the sampling ring inlet flange 1712 and extends over an entirety of the sampling ring inlet flange 1712 and an entirety of the sampling ring floor flange 1709.

The sampling ring 1706 also includes a sampling ring insert flange 1718 (e.g., annular flange, etc.). The sampling ring insert flange 1718 is contiguous with the sampling ring blocking flange 1716 and the sampling ring insert floor flange 1709. In various embodiments, the sampling ring insert flange 1718 extends from the sampling ring blocking flange 1716 in a direction that is parallel to a direction along which the sampling ring support flange 1711 extends and/or a direction along which the sampling ring base flange 1710 extends.

The sampling ring insert flange 1718 defines a sampling ring insert aperture 1720 (e.g., hole, opening, etc.). The outlet housing fitting 280 is received within the sampling ring insert aperture 1720. The outlet housing fitting 280 may be coupled to the sampling ring insert flange 1718 around at least a portion of the sampling ring insert aperture 1720. For example, the outlet housing fitting 280 may be welded to the sampling ring insert flange 1718 around an entirety of the sampling ring insert aperture 1720. In another example, the outlet housing fitting 280 is press-fit (e.g., friction fit, etc.) within the sampling ring insert aperture 1720.

The sampling ring 1706 also includes a connector 1722 (e.g., runner, etc.). The connector 1722 defines a connector cavity 1723 (e.g., void, etc.) within which the exhaust gas flows. The connector 1722 is configured such that the connector cavity 1723 receives the exhaust gas from the sampling ring cavity 1708.

As is explained in more detail herein, the connector 1722 is configured to provide the exhaust gas from the sampling ring cavity 1708 to a location where the outlet sensor 168 samples the exhaust gas. This location is separated from the outlet housing fitting 280 so as to separate the outlet sensor 168 from the exhaust gas flowing within the outlet housing fitting 280, which ensures desirable operation of the outlet sensor 168 is maintained.

The connector 1722 includes a connector outer flange 1724. The connector outer flange 1724 is contiguous with the sampling ring base flange 1710 and the cover 1702. The connector outer flange 1724 may also be contiguous with the sampling ring support flange 1711. The connector 1722 also includes a connector inner flange 1726. The connector inner flange 1726 is contiguous with the sampling ring base flange 1710 and the cover 1702. The connector inner flange 1726 may also be contiguous with the sampling ring support flange 1711.

The connector 1722 also includes a connector floor flange 1728. The connector floor flange 1728 is in confronting relation with the outlet housing body 278. In some embodiments, at least a portion of the connector floor flange 1728 is coupled to the outlet housing body 278. As is explained in more detail herein, the connector floor flange 1728 is configured so as to cause flow of the exhaust gas both towards the outlet housing body 278 and away from the outlet housing body 278.

The connector floor flange 1728 includes an outlet flange inlet portion 1730 (e.g., upstream portion, etc.). The outlet flange inlet portion 1730 may cause flow of the exhaust gas towards the outlet housing body 278. The outlet flange inlet portion 1730 is contiguous with the sampling ring base flange 1710, the cover 1702, the connector outer flange 1724, and the connector inner flange 1726. As is explained in more detail herein, the outlet flange inlet portion 1730 facilitates provision of the exhaust gas to the outlet sensor 168.

The connector floor flange 1728 also includes a sensor boss 1732 (e.g., recess, etc.). The sensor boss 1732 is contiguous with the outlet flange inlet portion 1730, the connector outer flange 1724, and the connector inner flange 1726. In various embodiments, the sensor boss 1732 is aligned with a portion (e.g., an outlet portion, etc.) of the outlet flange inlet portion 1730 such that the exhaust gas is not substantially redirected when flowing from the outlet flange inlet portion 1730 to the sensor boss 1732.

The sensor boss 1732 includes at least one sensor aperture 1734 (e.g., hole, etc.). Each of the sensor apertures 1734 is configured to receive a sensor, such as the outlet sensor 168. The outlet sensor 168 samples the exhaust gas within the sensor boss 1732, as opposed to sampling the exhaust gas within the outlet housing fitting 280.

In some embodiments, the exhaust gas aftertreatment system 100 also includes a second outlet sensor in addition to the outlet sensor 168. In these embodiments, the second outlet sensor is received within one of the sensor apertures 1734 and the outlet sensor 168 is received within the other sensor aperture 1734.

The connector floor flange 1728 also includes an outlet flange outlet portion 1735 (e.g., downstream portion, etc.). The outlet flange outlet portion 1735 is contiguous with the sensor boss 1732, the sampling ring base flange 1710, the cover 1702, the connector outer flange 1724, and the connector inner flange 1726. The outlet flange outlet portion 1735 facilitates provision of the exhaust gas from the outlet sensor 168.

In various embodiments, such as is shown in FIG. 19, the outlet flange outlet portion 1735 is raised relative to the sensor boss 1732. As a result, the exhaust gas is caused to flow away from the outlet housing body 278 when flowing from the sensor boss 1732 towards the sensor boss 1732. In this way, the outlet flange outlet portion 1735 may impede flow of the exhaust gas through the connector cavity 1723 which may enhance an ability of the outlet sensor 168 to sample the exhaust gas. For example, by impeding the flow of the exhaust gas through the connector cavity 1723, a residence time of the exhaust gas within the connector cavity 1723 may be increased which may enhance the ability of the outlet sensor 168 to sample the exhaust gas.

The connector 1722 also includes a connector blocking flange 1736. The connector blocking flange 1736 is separated from the outlet housing body 278 by the connector outer flange 1724, the connector inner flange 1726, and the connector floor flange 1728. As is explained in more detail herein, the connector blocking flange 1736 is configured so as to cause flow of the exhaust gas both towards the outlet housing body 278 and away from the outlet housing body 278.

The connector blocking flange 1736 includes a blocking flange inlet portion 1738 (e.g., upstream portion, etc.). The blocking flange inlet portion 1738 may cause flow of the exhaust gas towards the outlet housing body 278. The blocking flange inlet portion 1738 is contiguous with the sampling ring blocking flange 1716, the connector outer flange 1724, and the connector inner flange 1726. As is explained in more detail herein, the blocking flange inlet portion 1738 facilitates provision of the exhaust gas to the outlet sensor 168.

The connector blocking flange 1736 also includes a blocking flange rib 1740 (e.g., recess, etc.). The blocking flange rib 1740 is contiguous with the blocking flange inlet portion 1738, the connector outer flange 1724, and the connector inner flange 1726. The blocking flange rib 1740 projects towards the sensor boss 1732 between the sensor apertures 1734.

As shown in FIG. 20, the blocking flange rib 1740 includes an inlet surface 1742 (e.g., face, etc.). The blocking flange rib 1740 extends towards the sensor boss 1732 such that the inlet surface 1742 impedes flow of the exhaust gas within the connector cavity 1723. As a result, the exhaust gas is caused to flow towards the outlet housing body 278 when flowing along the inlet surface 1742. In this way, the blocking flange rib 1740 may direct flow of the exhaust gas toward across the outlet sensor 168 in a desirable manner, which may enhance an ability of the outlet sensor 168 to sample the exhaust gas within the connector cavity 1723. For example, by directing the flow of the exhaust gas towards the outlet housing body 278, a residence time of the exhaust gas within the connector cavity 1723 may be increased which may enhance the ability of the outlet sensor 168 to sample the exhaust gas.

The blocking flange rib 1740 also includes an outlet surface 1744 (e.g., face, etc.). The blocking flange rib 1740 extends away from the sensor boss 1732 such that the outlet surface 1744 does not assists in flow of the exhaust gas within the connector cavity 1723. As a result, the exhaust gas is caused to flow away from the outlet housing body 278 when flowing along the outlet surface 1744. A slope of the outlet surface 1744 may be significantly less than a slope of the inlet surface 1742. For example, the inlet surface 1742 may be approximately orthogonal to the sensor boss 1732 while the outlet surface 1744 may be separated from the sensor boss 1732 by an angle that is approximately in a range of 20° to 60°, inclusive.

The connector blocking flange 1736 also includes a blocking flange outlet portion 1746 (e.g., downstream portion, etc.). The blocking flange outlet portion 1746 is contiguous with the blocking flange rib 1740, the connector outer flange 1724, the connector inner flange 1726, and the sampling ring blocking flange 1716. The blocking flange outlet portion 1746 facilitates provision of the exhaust gas from the outlet sensor 168.

The outlet housing fitting 280 includes a fitting aperture 1748 (e.g., opening, window, slot, etc.). The fitting aperture 1748 facilitates flow of the exhaust gas from the connector cavity 1723 into the outlet housing fitting 280. For example, flow of the exhaust gas (e.g., that did not flow through the sampling ring inlet apertures 1714) through the outlet housing fitting 280 may create a vacuum at the fitting aperture 1748 which may draw the exhaust gas from the sampling bowl cavity 1308 and into the outlet housing fitting 280. In this way, the exhaust gas may be sampled by the outlet sensor 168 while minimizing exposure of the outlet sensor 168 to the exhaust gas, and therefore maintaining desirable operation of the outlet sensor 168 for a prolonged period of time. As a result, the outlet sampling system 166 is more desirable than other systems.

In some embodiments, the cover 1702, the sampling ring 1706, and/or the connector 1722 are integrally formed and made from a metal casting process, such as investment casting, sand casting, or another casting process. This may enable the cover 1702, the sampling ring 1706, and/or the connector 1722 to be produced more economically, and therefore more desirably, than other components which require use of more complex or costly manufacturing processes.

In some embodiments, the cover 1702, the sampling ring 1706, and/or the connector 1722 is integrally formed via additive manufacturing. For example, the cover 1702, the sampling ring 1706, and/or the connector 1722 may be integrally formed using 3D printing, selective laser sintering, selective laser melting (SLM), direct metal laser sintering (DMLS), electron beam melting (EBM), ultrasonic additive manufacturing (UAM), fused deposition modeling (FDM), fused filament fabrication (FFF), stereolithography (SLA), material jetting, binder jetting or other similar processes. As explained above, the cover 1702, the sampling ring 1706, and/or the connector 1722 is integrally formed when the portions of the cover 1702, the sampling ring 1706, and/or the connector 1722 are formed and joined together as part of a single manufacturing step (e.g., 3D printing, selective laser sintering, SLM, DMLS, EBM, UAM, FDM, FFF, SLA, material jetting, binder jetting, etc.) to a create a single-piece or unitary construction, the cover 1702, the sampling ring 1706, and/or the connector 1722, that cannot be disassembled without an at least partial destruction of the cover 1702, the sampling ring 1706, and/or the connector 1722. For example, the portions of the cover 1702, the sampling ring 1706, and/or the connector 1722 are: (i) not separable from each other (e.g., one portion of the cover 1702, the sampling ring 1706, and/or the connector 1722 cannot be separated from the cover 1702, the sampling ring 1706, and/or the connector 1722 without destroying the cover 1702, the sampling ring 1706, and/or the connector 1722, etc.); (ii) not formed separately from each other (e.g., the portions of the cover 1702, the sampling ring 1706, and/or the connector 1722 are formed simultaneously, the portions of the cover 1702, the sampling ring 1706, and/or the connector 1722 are formed as a single component in a single process, etc.); and (iii) there are no gaps or joints along borders between contiguous portions of the cover 1702, the sampling ring 1706, and/or the connector 1722 (e.g., portions that share a border, etc.).

VI. Configuration of Example Embodiments

As utilized herein, an area is measured along a plane (e.g., a two-dimensional plane, etc.) unless otherwise indicated. This area may change in a direction that is not disposed along the plane (e.g., along a direction that is orthogonal to the plane, etc.) unless otherwise indicated.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated

What is claimed is:

1. An exhaust gas aftertreatment system comprising:
   an outlet housing body;
   an outlet housing fitting;
   an outlet sampling system comprising:
     a sampling bowl coupled to the outlet housing body and extending away from the outlet housing body so as to define a sampling bowl cavity between the sampling bowl and the outlet housing body, and
     a sampling ring coupled to the sampling bowl and separated from the outlet housing body by the sampling bowl, the sampling ring coupled to the outlet housing fitting and defining a sampling ring cavity, the sampling ring comprising:
       a plurality of sampling ring inlet apertures, each of the sampling ring inlet apertures configured to receive exhaust gas from within the outlet housing body and provide the exhaust gas to the sampling ring cavity, and
       a connector that extends along the sampling bowl and defines a connector cavity that is contiguous with the sampling ring cavity and the sampling bowl cavity; and
   an outlet sensor coupled to the outlet housing body so as to have a portion that is disposed within the sampling bowl cavity.

2. The exhaust gas aftertreatment system of claim 1, wherein the outlet housing fitting comprises a fitting aperture that is contiguous with the sampling bowl cavity and configured to provide the exhaust gas from within the sampling bowl cavity into the outlet housing fitting.

3. The exhaust gas aftertreatment system of claim 1, wherein:
   the outlet housing fitting is centered on an outlet housing fitting axis; and
   the sampling ring inlet apertures are circumferentially disposed around the outlet housing fitting axis.

4. The exhaust gas aftertreatment system of claim 3 wherein the plurality of sampling ring inlet apertures are disposed in an angular range between 180° and 270° around the outlet housing fitting axis.

5. The exhaust gas aftertreatment system of claim 1, wherein the outlet housing fitting comprises a fitting aperture configured to facilitate flow of the exhaust gas from the sampling bowl cavity into the outlet housing fitting.

6. The exhaust gas aftertreatment system of claim 1, wherein:
   the sampling bowl comprises:
     a housing flange coupled to the outlet housing body; and a plurality of supports projecting away from the housing flange.

7. The exhaust gas aftertreatment system of claim 1, wherein the sampling bowl comprises a plurality of projections that project within the sampling bowl cavity, the plurality of projections configured to mitigate swirling of the exhaust gas within the sampling bowl cavity.

8. An exhaust gas aftertreatment system comprising:
an outlet housing body;
an outlet housing fitting having a fitting aperture;
an outlet sampling system comprising:
  a cover coupled to the outlet housing body, and
  a sampling ring defining a sampling ring cavity extending around the outlet housing fitting, the sampling ring comprising:
    a sampling ring floor flange in confronting relation with the outlet housing body,
    a sampling ring base flange contiguous with the sampling ring floor flange,
    a sampling ring insert flange contiguous with the sampling ring floor flange and in confronting relation with the outlet housing fitting,
    a sampling ring inlet flange contiguous with the sampling ring base flange, and
    a plurality of sampling ring inlet apertures disposed on the sampling ring inlet flange, the sampling ring inlet apertures configured to provide exhaust gas into the sampling ring cavity, and
  a connector defining a connector cavity that is contiguous with the sampling ring cavity and is configured to receive the exhaust gas from the sampling ring cavity and to provide the exhaust gas to the fitting aperture; and
an outlet sensor coupled to the outlet housing body so as to have a portion that is disposed within the connector cavity.

9. The exhaust gas aftertreatment system of claim 8, wherein the sampling ring further comprise a sampling ring support flange contiguous with the sampling ring base flange.

10. The exhaust gas aftertreatment system of claim 9, wherein the sampling ring inlet flange is separated from the sampling ring support flange by an obtuse angle.

11. The exhaust gas aftertreatment system of claim 8, wherein the connector includes a connector floor flange, a portion of the connector floor flange coupled to the outlet housing body and configured to cause flow of the exhaust gas both toward and away from the outlet housing body.

12. The exhaust gas aftertreatment system of claim 11, wherein the connector floor flange comprises a sensor boss configured to receive the outlet sensor.

13. The exhaust gas aftertreatment system of claim 8, wherein the connector comprises a connector blocking flange, the connector blocking flange separated from the outlet housing body and configured to cause flow of the exhaust gas both toward and away from the outlet housing body.

14. The exhaust gas aftertreatment system of claim 13, wherein the connector blocking flange comprises a blocking flange rib, the blocking flange rib comprising an inlet surface configured to impede the flow of the exhaust gas within the connector cavity.

15. The exhaust gas aftertreatment system of claim 8, wherein:
the outlet housing fitting is centered on an outlet housing fitting axis; and
the sampling ring inlet apertures are circumferentially disposed around the outlet housing fitting axis.

16. The exhaust gas aftertreatment system of claim 8, wherein portions of the sampling ring extend across a portion of each of the sampling ring inlet apertures.

17. An exhaust gas aftertreatment system comprising:
an outlet housing body;
an outlet housing fitting;
an outlet sampling system comprising:
  a sampling bowl coupled to the outlet housing body and extending away from the outlet housing body so as to define a sampling bowl cavity between the sampling bowl and the outlet housing body, the sampling bowl comprising:
    a sampling bowl wall, and
    a sampling bowl support flange contiguous with the sampling bowl wall and separated from the outlet housing body;
  a sampling ring coupled to the sampling bowl and separated from the outlet housing body by the sampling bowl, the sampling ring coupled to the outlet housing fitting and defining a sampling ring cavity, the sampling ring comprising:
    a sampling ring support flange coupled to the sampling bowl support flange, and
    a sampling ring inlet flange contiguous with and extending from the sampling ring support flange away from the sampling bowl support flange; and
an outlet sensor coupled to the outlet housing body so as to have a portion that is disposed within the sampling bowl cavity.

18. The exhaust gas aftertreatment system of claim 17, wherein the sampling ring further comprises a plurality of sampling ring inlet apertures, each of the sampling ring inlet apertures configured to receive exhaust gas from within the outlet housing body and provide the exhaust gas to the sampling ring cavity.

19. The exhaust gas aftertreatment system of claim 17, wherein the sampling bowl comprises a plurality of projections that project within the sampling bowl cavity, the plurality of projections configured to mitigate swirling of exhaust gas within the sampling bowl cavity.

20. The exhaust gas aftertreatment system of claim 17, wherein:
the sampling bowl comprises:
  a housing flange coupled to the outlet housing body, and
  a plurality of supports projecting away from the housing flange.

* * * * *